(12) United States Patent
Ohta et al.

(10) Patent No.: US 11,970,561 B2
(45) Date of Patent: Apr. 30, 2024

(54) MODIFIED LIQUID DIENE POLYMER AND RUBBER COMPOSITION

(71) Applicant: KURARAY CO., LTD., Okayama (JP)

(72) Inventors: Satomi Ohta, Kamisu (JP); Hiroshi Kanbara, Kamisu (JP); Daisuke Koda, Kamisu (JP)

(73) Assignee: KURARAY CO., LTD., Okayama (JP)

( * ) Notice: Subject to any disclaimer, the term of this patent is extended or adjusted under 35 U.S.C. 154(b) by 804 days.

(21) Appl. No.: 16/978,188

(22) PCT Filed: Mar. 4, 2019

(86) PCT No.: PCT/JP2019/008405
§ 371 (c)(1),
(2) Date: Sep. 4, 2020

(87) PCT Pub. No.: WO2019/172185
PCT Pub. Date: Sep. 12, 2019

(65) Prior Publication Data
US 2021/0017320 A1  Jan. 21, 2021

(30) Foreign Application Priority Data

Mar. 7, 2018 (JP) ................................ 2018-040832
Apr. 5, 2018 (JP) ................................ 2018-073362

(51) Int. Cl.
| | | |
|---|---|---|
| B60C 1/00 | (2006.01) | |
| C08C 19/20 | (2006.01) | |
| C08C 19/25 | (2006.01) | |
| C08F 297/02 | (2006.01) | |
| C08L 9/00 | (2006.01) | |
| C08L 9/06 | (2006.01) | |

(52) U.S. Cl.
CPC ............. *C08F 297/02* (2013.01); *B60C 1/00* (2013.01); *C08L 9/06* (2013.01); *C08C 19/20* (2013.01); *C08C 19/25* (2013.01); *C08L 9/00* (2013.01)

(58) Field of Classification Search
CPC ... C08L 9/00; C08L 9/06; C08C 19/20; C08C 19/25; C08F 297/02; C08F 297/04–048
See application file for complete search history.

(56) References Cited

U.S. PATENT DOCUMENTS

| | | | | |
|---|---|---|---|---|
| 3,140,278 A | * | 7/1964 | Kuntz | C08F 297/02 526/217 |
| 4,255,296 A | * | 3/1981 | Ogawa | C08L 21/00 524/505 |
| 9,850,336 B2 | | 12/2017 | Koda et al. | |
| 2014/0121316 A1 | * | 5/2014 | Monsallier | C08C 19/25 524/526 |
| 2014/0357759 A1 | | 12/2014 | Matsumoto et al. | |
| 2015/0057403 A1 | | 2/2015 | Koda et al. | |
| 2015/0361210 A1 | | 12/2015 | Nosaka et al. | |
| 2017/0009065 A1 | | 1/2017 | Koda et al. | |
| 2017/0073509 A1 | | 3/2017 | Koda et al. | |

FOREIGN PATENT DOCUMENTS

| | | | | |
|---|---|---|---|---|
| CN | 107586362 A | | 1/2018 | |
| DE | 102016210267 A1 | | 12/2017 | |
| EP | 2835387 A1 | | 2/2015 | |
| JP | 2000344949 A | | 12/2000 | |
| JP | 2011132298 A | | 7/2011 | |
| JP | 2013249359 A | | 12/2013 | |
| JP | 2014105238 A | * | 6/2014 | |
| JP | 2014105294 A | | 6/2014 | |
| JP | 2014162809 A | | 9/2014 | |
| JP | 2015113425 A | | 6/2015 | |
| RU | 2176663 C2 | | 12/2001 | |
| RU | 2343177 C2 | | 1/2009 | |
| RU | 2629197 C2 | | 8/2017 | |
| WO | 9640846 A1 | | 12/1996 | |
| WO | 2004081138 A1 | | 9/2004 | |
| WO | WO-2008041631 A1 | * | 4/2008 | ............ A43B 13/04 |
| WO | 2013081053 A1 | | 6/2013 | |
| WO | 2015137296 A1 | | 9/2015 | |

(Continued)

OTHER PUBLICATIONS

Machine translation of JP-2014105294-A (included in Oct. 15, 2020 IDS) from PatentScope. (Year: 2014).*
Machine translation of WO-2008041631-A1 obtained from IP.com (Year: 2008).*
Machine translation of JP-2014105238-A obtained from Patentscope (Year: 2014).*
Machine translation of WO-2015137295-A1 obtained from Patentscope (Year: 2015).*
Machine translation of JP-2011132298-A obtained from Patentscope (Year: 2011).*

(Continued)

*Primary Examiner* — Kregg T Brooks
*Assistant Examiner* — David R. Foss
(74) *Attorney, Agent, or Firm* — HAUPTMAN HAM, LLP

(57) ABSTRACT

The invention provides a modified liquid diene polymer that allows a rubber composition to give a crosslinked product which contains a filler in a dispersed state ideal for attaining enhanced properties and which also exhibits excellent properties such as wet grip and abrasion resistance. The invention also provides a rubber composition including the modified liquid diene polymer, a crosslinked product thereof, and a tire which includes a portion including the composition or the crosslinked product. The modified liquid diene polymer is a product of modification, with a specific silane compound, of a liquid diene block copolymer including a polymer block (b'1) or (b"1) containing butadiene units and a polymer block (b'2) or (b"2). The modified liquid diene polymer has a functional group derived from the silane compound, and satisfies specific conditions.

19 Claims, No Drawings

(56) References Cited

FOREIGN PATENT DOCUMENTS

WO     WO-2015137295 A1 * 9/2015 ............... B60C 1/00

OTHER PUBLICATIONS

International Search Report in PCT Application No. PCT/JP2019/008405, dated May 28, 2019, 2pp.
Written Opinion in PCT Application No. PCT/JP2019/008405, dated May 28, 2019, 5pp.
Office Action in RU Application No. 2020131780 dated Jan. 31, 2022, 20pp.
Seach Report in RU Application No. 2020131780 dated Jan. 31, 2022, 5pp.
Extended European Search Report in EP Application No. 19764978.3 dated Nov. 12, 2021, 6pp.
Office Action in Taiwan Application No. 108107206 dated May 24, 2022, 8pp.

* cited by examiner

MODIFIED LIQUID DIENE POLYMER AND RUBBER COMPOSITION

RELATED APPLICATIONS

The present application is a National Phase of International Application No. PCT/JP2019/008405, filed Mar. 4, 2019, and claims priority based on Japanese Patent Application No. 2018-040832, filed Mar. 7, 2018 and Japanese Patent Application No. 2018-073362, filed Apr. 5, 2018.

TECHNICAL FIELD

The present invention relates to a modified liquid diene polymer and a rubber composition.

BACKGROUND ART

Fillers such as silica and carbon black are conventionally added to rubber components such as natural rubbers and styrene butadiene rubbers to enhance the mechanical strength. Such rubber compositions are widely used in tire applications and the like which require abrasion resistance and mechanical strength. It has been pointed out that the state of a filler dispersed in a crosslinked product of a filled rubber composition can affect properties (such as, for example, wet grip and abrasion resistance) of the crosslinked product. Unfortunately, the dispersibility of a filler in a filled rubber composition is sometimes insufficient due to the facts that the affinity between a rubber and a filler is not necessarily high and that filler molecules interact with one another. In such cases, the dispersion state is not often ideal for a crosslinked product to attain enhanced properties.

The filler dispersibility in rubber compositions is enhanced by various approaches using liquid rubbers having a functional group (see, for example, Patent Literatures 1 and 2).

However, there is still room for improvements in properties (for example, wet grip and abrasion resistance) of crosslinked products obtained from such rubber compositions according to the conventional techniques.

Further, the enhancements in these properties are probably associated with how well a filler is dispersed in a crosslinked product. The existing techniques still have room for improvement in terms of, for example, sufficient reduction in the Payne effect which is a measure of the enhancement in dispersibility of a filler in a rubber composition.

CITATION LIST

Patent Literature

Patent Literature 1: JP-A-2000-344949
Patent Literature 2: JP-A-2013-249359

SUMMARY OF INVENTION

Technical Problem

The present invention has been made in light of the circumstances discussed above, and provides a modified liquid diene polymer that allows a rubber composition to give a crosslinked product which contains a filler in a dispersed state ideal for attaining enhanced properties and which also exhibits excellent properties such as wet grip and abrasion resistance. The present invention also provides a rubber composition including the modified liquid diene polymer, a crosslinked product thereof, and a tire which includes a portion including the composition or the crosslinked product.

Solution to Problem

As a result of extensive studies, the present inventors have found that a specific modified liquid diene polymer which contains two kinds of polymer blocks having different reactivities with respect to a specific silane compound may be added to a rubber composition to allow the rubber composition to give a crosslinked product which contains a filler in a dispersed state ideal for attaining enhanced properties and which further exhibits excellent properties such as wet grip and abrasion resistance. The present invention has been completed based on the finding.

Specifically, the present invention pertains to the following [1] to [15].

[1] A modified liquid diene polymer (B1) comprising a product of modification, with a silane compound represented by the formula (1) below, of a liquid diene block copolymer (B'1) including a polymer block (b'1) containing butadiene units and a polymer block (b'2), the modified liquid diene polymer (B1) having a functional group derived from the silane compound represented by the formula (1), the modified liquid diene polymer (B1) satisfying the following (i) to (iv):

(i) the weight average molecular weight (Mw) of the modified liquid diene rubber is 1,000 to 120,000,
(ii) the vinyl content in the butadiene units in the polymer block (b'1) is 40 to 100 mol %,
(iii) the polymer block (b'2) contains butadiene units having a vinyl content of 0 to 25 mol %, and
(iv) the average number of functional groups per molecule of the modified liquid diene polymer (B1) is 1 to 20.

[Chem. 1]

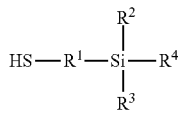

(1)

wherein $R^1$ is a $C_{1-6}$ divalent alkylene group, and $R^2$, $R^3$ and $R^4$ are each independently a methoxy group, an ethoxy group, a phenoxy group, a methyl group, an ethyl group or a phenyl group, with the proviso that at least one of $R^2$, $R^3$ and $R^4$ is a methoxy group, an ethoxy group or a phenoxy group.

[2] The modified liquid diene polymer (B1) described in [1], wherein the modified liquid diene polymer (B1) is a linear polymer, the polymer block (b'1) is present at one end or both ends of the liquid diene block copolymer (B'1), and the total length of the polymer block(s) (b'1) is not more than 45% of all the chain length of the liquid diene block copolymer (B'1).

[3] A modified liquid diene polymer (B2) comprising a product of modification, with a silane compound represented by the above formula (1), of a liquid diene block copolymer (B'2) including a polymer block (b"1) containing butadiene units and a polymer block (b"2), the modified liquid diene polymer (B2) having a functional group derived from the silane compound represented by the formula (1), the modified liquid diene polymer (B2) satisfying the following (v) to (vii):

(v) the weight average molecular weight (Mw) of the modified liquid diene polymer (B2) is 1,000 to 120,000,
(vi) the polymer block (b"2) includes at least one kind of monomer units selected from the group consisting of conjugated diene units other than butadiene, and aromatic vinyl compound units, and
(vii) the average number of functional groups per molecule of the modified liquid diene polymer (B2) is 1 to 20.

[4] The modified liquid diene polymer (B2) described in [3], wherein the modified liquid diene polymer (B2) is a linear polymer, the polymer block (b"1) is present at one end or both ends of the liquid diene block copolymer (B'2), and the total length of the polymer block(s) (b"1) is not more than 45% of all the chain length of the liquid diene block copolymer (B'2).

[5] The modified liquid diene polymer (B1) or (B2) described in any of [1] to [4], wherein the modified liquid diene polymer (B1) or (B2) is a linear polymer, and not less than 65% of the functional groups derived from the silane compound are present in a region or regions extending from one end or both ends to 45% in total of all the chain length of the modified liquid diene polymer (B1) or (B2).

[6] The modified liquid diene polymer (B1) or (B2) described in any of [1] to [5], wherein the melt viscosity at 38° C. is 0.1 to 4,000 Pa·s.

[7] A rubber composition comprising 100 parts by mass of a solid rubber (A), 0.1 to 50 parts by mass of a modified liquid diene polymer (B1) or (B2) described in any of [1] to [6], and 20 to 200 parts by mass of a filler (C).

[8] The rubber composition described in [7], wherein the filler (C) is at least one selected from carbon blacks and silicas.

[9] The rubber composition described in [8], wherein the filler (C) is at least one selected from carbon blacks having an average particle size of 5 to 100 nm, and silicas having an average particle size of 0.5 to 200 nm.

[10] The rubber composition described in [8] or [9], wherein the filler (C) comprises a silica, and the rubber composition further comprises 0.1 to 30 parts by mass of a silane coupling agent with respect to 100 parts by mass of the silica.

[11] The rubber composition described in any of [7] to [10], wherein the solid rubber (A) is at least one selected from natural rubbers, styrene butadiene rubbers, butadiene rubbers and isoprene rubbers.

[12] The rubber composition described in [11], wherein the solid rubber (A) is a styrene butadiene rubber having a weight average molecular weight of 100,000 to 2,500,000.

[13] The rubber composition described in [11] or [12], wherein the solid rubber (A) is a styrene butadiene rubber having a styrene content of 0.1 to 70 mass %.

[14] A crosslinked product obtained by crosslinking a rubber composition described in any of [7] to [13].

[15] A tire comprising, as at least a portion of the tire, a rubber composition described in any of [7] to [13] or a crosslinked product described in [14].

Advantageous Effects of Invention

The specific modified liquid diene polymers obtained according to the present invention may be added to a rubber composition to allow the rubber composition to give a crosslinked product which contains a filler in a dispersed state ideal for attaining enhanced properties and which further exhibits excellent properties such as wet grip and abrasion resistance. The composition or the crosslinked product is useful in, for example, tires.

DESCRIPTION OF EMBODIMENTS

[Modified Liquid Diene Polymers]

A modified liquid diene polymer of the present invention is a polymer obtained by modifying an unmodified liquid diene block copolymer which includes a butadiene unit-containing polymer block and a dissimilar polymer block, with a silane compound represented by the aforementioned formula (1). The polymer has a functional group derived from the silane compound represented by the formula (1), and is further required to satisfy specific conditions.

Hereinbelow, the modified liquid diene polymers of the present invention are collectively written as the modified liquid diene polymers (B), and the unmodified liquid diene block copolymers as the raw materials thereof are also collectively referred to as the unmodified liquid diene block copolymers (B'). The silane compounds represented by the formula (1) are written as the silane compounds (1). The modified liquid diene polymer (B) of the present invention that is obtained from the specific unmodified liquid diene block copolymer (B') attains desired properties probably because the two kinds of polymer blocks contained in the unmodified liquid diene block copolymer (B') have different reactivities with respect to the silane compound (1).

[Unmodified Liquid Diene Block Copolymers (B')]

Hereinbelow, the unmodified liquid diene block copolymers (B') that are the raw materials for the modified liquid diene polymers (B) will be described. Examples of the unmodified liquid diene block copolymers (B') include unmodified liquid diene block copolymers (B'1) and unmodified liquid diene block copolymers (B'2) described below.

[Unmodified Liquid Diene Block Copolymers (B'1)]

A modified liquid diene polymer (B1) according to a first embodiment of the modified liquid diene polymers (B) of the present invention is a product of modification, with the silane compound (1), of an unmodified liquid diene block copolymer (B'1) including a polymer block (b'1) containing butadiene units and a polymer block (b'2), and has a functional group derived from the silane compound (1) and further satisfies the following (i) to (iv).
 (i) The weight average molecular weight (Mw) of the modified liquid diene rubber (B1) is 1,000 to 120,000.
 (ii) The vinyl content in the butadiene units in the polymer block (b'1) is 40 to 100 mol %.
 (iii) The polymer block (b'2) contains butadiene units having a vinyl content of 0 to 25 mol %.
 (iv) The average number of functional groups per molecule of the modified liquid diene polymer (B1) is 1 to 20.

The raw material for the modified liquid diene polymer (B1) is the unmodified liquid diene block copolymer (B'1), which includes a polymer block (b'1) and a polymer block (b'2).

The polymer block (b'1) contains butadiene units having a vinyl content of 40 to 100 mol %. Butadiene units having a vinyl content in the specified range exhibit excellent reactivity with respect to the silane compound (1).

In the present invention, the "vinyl content" means the total molar percentage of 1,2-bonded conjugated diene units and 3,4-bonded conjugated diene units (conjugated diene units except 1,4-bonded conjugated diene units) relative to the total of butadiene units and conjugated diene units other than butadiene units contained in the moiety of interest (for example, the polymer block or the entire liquid diene rubber) taken as 100 mol %. The vinyl content may be determined by $^1$H-NMR based on the area ratio of the peaks assigned to 1,2-bonded conjugated diene units and 3,4-bonded conjugated diene units, and the peak assigned to 1,4-bonded conjugated diene units.

The vinyl content in the butadiene units contained in the polymer block (b'1) is 40 to 100 mol %. By virtue of the vinyl content being in this range, the polymer block (b'1) exhibits high reactivity with the silane compound represented by the formula (1) and allows a plurality of functional groups to be introduced into the polymer block with ease. To attain higher reactivity with the silane compound represented by the formula (1) and to further facilitate the introduction of a plurality of functional groups, the vinyl content is preferably 50 to 100 mol %, more preferably 55 to 100 mol %, and still more preferably 60 to 100 mol %.

The vinyl content in the conjugated diene units such as butadiene units in the polymer block (b'1) may be brought to the desired value by, for example, selecting the types of a solvent and an optional polar compound used in the production of the polymer block (b'1), or controlling the production conditions such as polymerization temperature.

To attain high reactivity with the silane compound represented by the formula (1) and to facilitate the introduction of a plurality of functional groups into the polymer block (b'1), the content of the butadiene units in the polymer block (b'1) is preferably 50 to 100 mass %, more preferably 60 to 100 mass %, and still more preferably 70 to 100 mass % relative to all the monomer units in the polymer block (b'1), and may be substantially 100 mass %.

The polymer block (b'1) may contain other monomer units. Examples of such additional monomers include conjugated dienes other than butadiene, and aromatic vinyl compounds.

Examples of the conjugated dienes other than butadiene include isoprene, 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene and chloroprene. Of the conjugated dienes other than butadiene, isoprene is preferable. When the polymer block (b'1) contains conjugated diene units other than butadiene as additional monomer units, the vinyl content in the conjugated diene units other than butadiene is preferably 40 to 100 mol %, more preferably 50 to 100 mol %, still more preferably 55 to 100 mol %, and particularly preferably 60 to 100 mol %.

Examples of the aromatic vinyl compounds include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene and divinylbenzene. Of the aromatic vinyl compounds, styrene, α-methylstyrene and 4-methylstyrene are preferable.

The content of the additional monomer units other than butadiene units in the polymer block (b'1) is preferably not more than 50 mass %, more preferably not more than 40 mass %, and still more preferably not more than 30 mass %, and may be 0 mass %.

The unmodified liquid diene block copolymer (B'1) may include a single polymer block (b'1) or may include two or more polymer blocks (b'1). When a plurality of polymer blocks (b'1) are contained, the properties of the polymer blocks (b'1) (for example, the types of the monomer units, the proportions of the monomer units, and the lengths of the polymer blocks) may be the same as or different from one another.

The polymer block (b'2) contains butadiene units having a vinyl content of 0 to 25 mol %. The butadiene units (b'2) having a vinyl content in the specified range exhibit lower reactivity with the silane compound (1) as compared to the polymer block (b'1).

From points of view such as low reactivity with the silane compound represented by the formula (1), the vinyl content in the butadiene units contained in the polymer block (b'2) is preferably 0 to 20 mol %, more preferably 0 to 15 mol %, and still more preferably 0 to 10 mol %.

The vinyl content in the conjugated diene units such as butadiene units in the polymer block (b'2) may be brought to the desired value by, for example, selecting the types of a solvent and an optional polar compound used in the production of the polymer block (b'2), or controlling the production conditions such as polymerization temperature.

To improve the abrasion resistance of a crosslinked product from a rubber composition including the modified liquid diene polymer (B1) in a DIN abrasion test, the content of the butadiene units in the polymer block (b'2) is preferably 50 to 100 mass %, more preferably 60 to 100 mass %, and still more preferably 70 to 100 mass % relative to all the monomer units in the polymer block (b'2), and may be substantially 100 mass %.

The polymer block (b'2) may contain other monomer units. Examples of such additional monomers include conjugated dienes other than butadiene, and aromatic vinyl compounds.

Specific examples of the conjugated dienes other than butadiene are the same as the conjugated dienes other than butadiene which may form additional monomer units in the polymer block (b'1). Of the conjugated dienes other than butadiene, isoprene is preferable. When the polymer block (b'2) contains conjugated diene units other than butadiene as additional monomer units, the vinyl content in the conjugated diene units other than butadiene is preferably 0 to 25 mol %, more preferably 0 to 20 mol %, still more preferably 0 to 15 mol %, and particularly preferably 0 to 10 mol %.

Specific examples of the aromatic vinyl compounds are the same as the aromatic vinyl compounds which may form additional monomer units in the polymer block (b'1). Of the aromatic vinyl compounds, styrene, α-methylstyrene and 4-methylstyrene are preferable.

The content of the additional monomer units other than butadiene units in the polymer block (b'2) is preferably not more than 50 mass %, more preferably not more than 40 mass %, and still more preferably not more than 30 mass %, and may be 0 mass %.

The unmodified liquid diene block copolymer (B'1) may include a single polymer block (b'2) or may include two or more polymer blocks (b'2). When a plurality of polymer blocks (b'2) are contained, the properties of the polymer blocks (b'2) (for example, the types of the monomer units, the proportions of the monomer units, and the lengths of the polymer blocks) may be the same as or different from one another.

The unmodified liquid diene block copolymer (B'1) may include a polymer block (b'3) other than the polymer blocks (b'1) and (b'2). Some example monomers that may form monomer units in the polymer block (b'3) are conjugated dienes other than butadiene, and aromatic vinyl compounds. Specific examples of these compounds are the same as the conjugated dienes other than butadiene, and the aromatic vinyl compounds which may form additional monomer units in the polymer block (b'1). When a plurality of polymer blocks (b'3) are contained, the properties of the polymer blocks (b'3) (for example, the types of the monomer units, the proportions of the monomer units, and the lengths of the polymer blocks) may be the same as or different from one another.

From points of view such as interaction with silica, the modified liquid diene polymer that is obtained is preferably a linear polymer. To produce a linear modified liquid diene polymer, it is preferable that the unmodified block copolymer (B'1) be a linear block copolymer.

In the unmodified block copolymer (B'1), the polymer block (b'1) is preferably present at one end or both ends of the liquid diene block copolymer (B'1). When the polymer block (b'1) is present at an end or ends of the unmodified block copolymer (B'1), functional groups derived from the silane compound (1) will be unevenly distributed at the terminal polymer block (s) in the modified liquid diene polymer (B1) that is obtained. When, for example, such a modified liquid diene polymer (B1) is used as a component of a rubber composition described later, the modified liquid diene polymer (B1) exhibits a further enhanced affinity with a filler and tends to enhance the abrasion resistance of crosslinked products obtained from the rubber composition.

The total length of the polymer block(s) (b'1) is preferably not more than 45% of all the chain length of the unmodified liquid diene block copolymer (B'1), and is more preferably not more than 40%, still more preferably not more than 30%, and particularly preferably not more than 25%. When such an unmodified liquid block copolymer (B'1) as the raw material is modified into a liquid diene polymer (B1), the modified liquid diene polymer (B1) comes to have a distinct moiety highly affinitive with a solid rubber and a distinct moiety highly affinitive with a filler. Thus, the modified liquid diene polymer (B1) used as, for example, a component of a rubber composition described later exhibits higher affinity for a solid rubber and higher affinity for a filler, and consequently the modified liquid diene polymer (B1) tends to enhance the abrasion resistance of crosslinked products obtained from the rubber composition containing the modified liquid diene polymer (B1). Here, phrases such as "the total length is X % of all the chain length" mean that when the polymer molecule includes a plurality of polymer blocks (b'1), the total of the chain lengths of the polymer blocks is X %. The lengths of the polymer blocks in the block copolymer may be obtained by determining the respective numbers of the monomer units contained in the block copolymer by $^1$H-NMR measurement and calculating the lengths assuming that the bond length of a carbon-carbon single bond in the main chain of the block copolymer is 150 pm, the bond length of a carbon-carbon double bond is 135 pm, and the bond angle is 120°.

Regarding the block configuration, the unmodified block copolymer (B'1) is preferably a linear diblock copolymer or a linear triblock copolymer represented by the following general formulae wherein b'1 denotes a polymer block (b'1) and b'2 a polymer block (b'2).

Linear diblock copolymer: b'1-b'2
Linear triblock copolymer: b'1-b'2-b'1

Of these, the use of a linear diblock copolymer results in better abrasion resistance of crosslinked products obtained. While the detailed reasons are unknown, it is probable that a diblock copolymer offers a long polymer chain extending from the bonding point between the silanol group on the silica surface and the modified liquid diene rubber (B1), and the bonding point can be prevented from a stress concentration thereto when a strain is applied to the entirety of a crosslinked rubber product obtained from a rubber composition including the modified liquid diene polymer (B1). Further, the use of a linear triblock copolymer provides better rolling resistance performance of crosslinked products of a rubber composition including the modified liquid diene polymer (B1). While the detailed reasons are unknown, it is probable that a triblock copolymer offers a short polymer chain extending from the bonding point between the silanol group on the silica surface and the modified liquid diene rubber (B1), and crosslinked products that are obtained attain a reduced energy loss and a small tan δ.

To ensure that, for example, the modified liquid diene rubber that is obtained will attain more excellent characteristics, the content of the polymer block (b'1) and the content of the polymer block (b'2) in the unmodified linear block copolymer (B'1) are preferably 0.05 mass % to 45 mass %, and 55 mass % to 99.95 mass %, respectively, and the content of the polymer block (b'1) and the content of the polymer block (b'2) are more preferably 0.05 mass % to 40 mass %, and 60 mass % to 99.95 mass %, respectively. The contents of the polymer blocks (b'1) and (b'2) in the unmodified linear block copolymer (B'1) may be determined by $^1$H-NMR measurement or the like. When the unmodified linear block copolymer (B'1) includes a plurality of polymer blocks (b'1), the content described above of the polymer block (b'1) means the total amount of all the polymer blocks (b'1) contained in the unmodified linear block copolymer (B'1) (the same applies also to the content of the polymer block (b'2)).

[Unmodified Liquid Diene Block Copolymers (B'2)]

A modified liquid diene polymer (B2) according to a second embodiment of the modified liquid diene polymers (B) of the present invention is a product of modification, with the silane compound (1), of an unmodified liquid diene block copolymer (B'2) including a polymer block (b"1) containing butadiene units and a polymer block (b"2), and has a functional group derived from the silane compound (1) and further satisfies the following (v) to (vii).

(v) The weight average molecular weight (Mw) of the modified liquid diene polymer (B2) is 1,000 to 120,000.

(vi) The polymer block (b"2) includes at least one kind of monomer units selected from the group consisting of conjugated diene units other than butadiene, and aromatic vinyl compound units.

(vii) The average number of functional groups per molecule of the modified liquid diene polymer (B2) is 1 to 20.

The raw material for the modified liquid diene polymer (B2) is the unmodified liquid diene block copolymer (B'2), which includes a polymer block (b"1) and a polymer block (b"2).

The polymer block (b"1) contains butadiene units. The polymer block (b" 1) exhibits excellent reactivity with respect to the silane compound (1) as compared to the polymer block (b"2).

To attain high reactivity with the silane compound represented by the formula (1) and to facilitate the introduction of a plurality of functional groups into the polymer block (b"1), the content of the butadiene units in the polymer block (b"1) is preferably 50 to 100 mass %, more preferably 60 to 100 mass %, and still more preferably 70 to 100 mass % relative to all the monomer units in the polymer block (b"1), and may be substantially 100 mass %.

To attain high reactivity with the silane compound represented by the formula (1) and to facilitate the introduction of a plurality of functional groups into the polymer block (b"1), the vinyl content in the butadiene units contained in the polymer block (b"1) is preferably 1 to 80 mol %, more preferably 10 to 80 mol %, still more preferably 25 to 80 mol %, and particularly preferably 30 to 80 mol %.

The vinyl content in the conjugated diene units such as butadiene units in the polymer block (b"1) may be brought to the desired value by, for example, selecting the types of a solvent and an optional polar compound used in the production of the polymer block (b"1), or controlling the production conditions such as polymerization temperature.

The polymer block (b"1) may contain other monomer units. Examples of such additional monomers include conjugated dienes other than butadiene, and aromatic vinyl compounds.

Specific examples of the conjugated dienes other than butadiene are the same as the conjugated dienes other than butadiene which may form additional monomer units in the polymer block (b'1) in the unmodified liquid diene block copolymer (B'1). Of the conjugated dienes other than butadiene, isoprene is preferable. When the polymer block (b"1) contains conjugated diene units other than butadiene as additional monomer units, the vinyl content in the conjugated diene units other than butadiene is preferably 1 to 80 mol %, more preferably 10 to 80 mol %, still more preferably 25 to 80 mol %, and particularly preferably 30 to 80 mol %.

Specific examples of the aromatic vinyl compounds are the same as the aromatic vinyl compounds which may form additional monomer units in the polymer block (b'1) in the unmodified liquid diene block copolymer (B'1). Of the aromatic vinyl compounds, styrene, α-methylstyrene and 4-methylstyrene are preferable.

The content of the additional monomer units other than butadiene units in the polymer block (b"1) is preferably not more than 50 mass %, more preferably not more than 40 mass %, and still more preferably not more than 30 mass %, and may be 0 mass %.

The unmodified liquid diene block copolymer (B'2) may include a single polymer block (b"1) or may include two or more polymer blocks (b"1). When a plurality of polymer blocks (b" 1) are contained, the properties of the polymer blocks (b"1) (for example, the types of the monomer units, the proportions of the monomer units, and the lengths of the polymer blocks) may be the same as or different from one another.

The polymer block (b"2) includes at least one kind of monomer units selected from the group consisting of conjugated diene units other than butadiene, and aromatic vinyl compound units. The polymer block (b"2) exhibits lower reactivity with the silane compound (1) as compared to the polymer block (b"1).

Specific examples of the conjugated dienes other than butadiene are the same as the conjugated dienes other than butadiene which may form additional monomer units in the polymer block (b"1). Of the conjugated dienes other than butadiene, isoprene is preferable. When the polymer block (b"2) contains conjugated diene units as additional monomer units, the vinyl content in such units is preferably 0 to 60 mol %, more preferably 0 to 50 mol %, still more preferably 0 to 45 mol %, and particularly preferably 0 to 40 mol %.

Specific examples of the aromatic vinyl compounds are the same as the aromatic vinyl compounds which may form additional monomer units in the polymer block (b"1). Of the aromatic vinyl compounds, styrene, α-methylstyrene and 4-methylstyrene are preferable.

From points of view such as low reactivity with the silane compound represented by the formula (1), the content of the at least one kind of monomer units selected from the group consisting of conjugated diene units other than butadiene, and aromatic vinyl compound units in the polymer block (b"2) is preferably 50 to 100 mass %, more preferably 60 to 100 mass %, and still more preferably 70 to 100 mass % relative to all the monomer units in the polymer block (b"2), and may be substantially 100 mass %.

The unmodified liquid diene block copolymer (B'2) may include a single polymer block (b"2) or may include two or more polymer blocks (b"2). When a plurality of polymer blocks (b"2) are contained, the properties of the polymer blocks (b"2) (for example, the types of the monomer units, the proportions of the monomer units, and the lengths of the polymer blocks) may be the same as or different from one another.

From points of view such as interaction with silica, the modified liquid diene polymer that is obtained is preferably a linear polymer. To produce a linear modified liquid diene polymer, it is preferable that the unmodified block copolymer (B'2) be a linear block copolymer.

In the unmodified block copolymer (B'2), the polymer block (b"1) is preferably present at one end or both ends of the liquid diene block copolymer (B'2). When the polymer block (b"1) is present at an end or ends of the unmodified block copolymer (B'2), functional groups derived from the silane compound (1) will be unevenly distributed at the terminal polymer block (s) in the modified liquid diene polymer (B2) that is obtained. When, for example, such a modified liquid diene polymer (B2) is used as a component of a rubber composition described later, the polymer exhibits a further enhanced affinity with a filler and tends to enhance the abrasion resistance of crosslinked products obtained from the rubber composition.

The total length of the polymer block(s) (b"1) is preferably not more than 45% of all the chain length of the unmodified liquid diene block copolymer (B'2), and is more preferably not more than 30%, still more preferably not more than 20%, and particularly preferably not more than 15%. When such an unmodified liquid block copolymer (B'2) as the raw material is modified into a liquid diene rubber (B2), the modified liquid diene polymer (B2) comes to have a distinct moiety highly affinitive with a solid rubber and a distinct moiety highly affinitive with a filler. Thus, the modified liquid diene polymer (B2) used as, for example, a component of a rubber composition described later exhibits higher affinity for a solid rubber and higher affinity for a filler, and consequently the modified liquid diene polymer (B2) tends to enhance the abrasion resistance of crosslinked products obtained from the rubber composition containing the modified liquid diene polymer (B2).

Regarding the block configuration, the unmodified block copolymer (B'2) is preferably a linear diblock copolymer or a linear triblock copolymer represented by the following general formulae wherein b"1 denotes a polymer block (b"1) and b"2 a polymer block (b"2).

Linear diblock copolymer: b"1-b"2
Linear triblock copolymer: b"1-b"2-b"1

Of these, the use of a linear diblock copolymer results in better abrasion resistance of crosslinked products obtained. While the detailed reasons are unknown, it is probable that a diblock copolymer offers a long polymer chain extending from the bonding point between the silanol group on the silica surface and the modified liquid diene rubber (B2), and the bonding point can be prevented from a stress concentration thereto when a strain is applied to the entirety of a crosslinked rubber product obtained from a rubber composition including the modified liquid diene polymer (B2). Further, the use of a linear triblock copolymer provides better rolling resistance performance of crosslinked products of a rubber composition including the modified liquid diene polymer (B2). While the detailed reasons are unknown, it is probable that a triblock copolymer offers a short polymer chain extending from the bonding point between the silanol group on the silica surface and the modified liquid diene rubber (B2), and crosslinked products that are obtained attain a reduced energy loss and a small tan δ.

To ensure that, for example, the modified liquid diene rubber that is obtained will attain more excellent characteristics, the content of the polymer block (b"1) and the content of the polymer block (b"2) in the unmodified linear block copolymer (B'2) are preferably 0.05 mass % to 45 mass %, and 55 mass % to 99.95 mass %, respectively, and the content of the polymer block (b"1) and the content of the polymer block (b"2) are more preferably 0.05 mass % to 30 mass %, and 70 mass % to 99.95 mass %, respectively. The content of the polymer block (b"1) and the content of the polymer block (b"2) are still more preferably 0.05 mass % to 20 mass %, and 80 mass % to 99.95 mass %, respectively. The contents of the polymer blocks (b"1) and (b"2) in the unmodified linear block copolymer (B'2) may be determined by $^1$H-NMR measurement or the like. When the unmodified linear block copolymer (B'2) includes a plurality of polymer blocks (b"1), the content described above of the polymer block (b"1) means the total amount of all the polymer blocks (b"1) contained in the unmodified linear block copolymer (B'2) (the same applies also to the content of the polymer block (b"2)).

The unmodified liquid diene block copolymer (B'1) or (B'2) may be produced by any method without limitation. Preferably, the copolymer is produced by the solution polymerization of conjugated dienes and optional monomers other than conjugated dienes. According to the solution polymerization process, the unmodified block copolymer (B'1) or (B'2) may be easily produced by sequentially polymerizing the polymer blocks.

The solution polymerization process may be a known process or a process that is deemed as known. For example, monomers including the conjugated diene are polymerized in a solvent with a Ziegler catalyst, a metallocene catalyst or an active metal or an active metal compound capable of catalyzing anionic polymerization, optionally in the presence of a polar compound as desired.

Examples of the solvents include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene, toluene and xylene.

Examples of the active metals capable of catalyzing anionic polymerization include alkali metals such as lithium, sodium and potassium; alkaline earth metals such as beryllium, magnesium, calcium, strontium and barium; and lanthanoid rare earth metals such as lanthanum and neodymium. Of the active metals capable of catalyzing anionic polymerization, alkali metals and alkaline earth metals are preferable, and alkali metals are more preferable.

Preferred active metal compounds capable of catalyzing anionic polymerization are organoalkali metal compounds. Examples of the organoalkali metal compounds include organomonolithium compounds such as methyllithium, ethyllithium, n-butyllithium, sec-butyllithium, t-butyllithium, hexyllithium, phenyllithium and stilbenelithium; polyfunctional organolithium compounds such as dilithiomethane, dilithionaphthalene, 1,4-dilithiobutane, 1,4-dilithio-2-ethylcyclohexane and 1,3,5-trilithiobenzene; sodium naphthalene and potassium naphthalene. Of these organoalkali metal compounds, organolithium compounds are preferable, and organomonolithium compounds are more preferable.

The amount in which the organoalkali metal compounds are used may be determined appropriately in accordance with factors such as the melt viscosities and molecular weights of the unmodified block copolymer (B'1) or (B'2) and the modified liquid diene polymer (B1) or (B2). Usually, the amount of such compounds is 0.01 to 3 parts by mass per 100 parts by mass of all the monomers including the conjugated dienes.

The organoalkali metal compound may be used in the form of an organoalkali metal amide by being subjected to a reaction with a secondary amine such as dibutylamine, dihexylamine or dibenzylamine.

The polar compounds are usually used in the anionic polymerization for the purpose of controlling the microstructure (for example, the vinyl content) of conjugated diene moieties without deactivating the reaction. Examples of the polar compounds include ether compounds such as dibutyl ether, tetrahydrofuran and ethylene glycol diethyl ether; tertiary amines such as tetramethylethylenediamine and trimethylamine; alkali metal alkoxides and phosphine compounds. The polar compounds are usually used in an amount of 0.01 to 1000 mol per mol of the organoalkali metal compound.

The temperature of the solution polymerization is usually in the range of −80 to 150° C., preferably in the range of 0 to 100° C., and more preferably in the range of 10 to 90° C. The polymerization mode may be batchwise or continuous.

The polymerization reaction may be terminated by the addition of a polymerization terminator. Examples of the polymerization terminators include alcohols such as methanol and isopropanol. The unmodified liquid diene block copolymer (B'1) or (B'2) may be isolated by pouring the polymerization reaction liquid into a poor solvent such as methanol to precipitate the unmodified liquid diene block copolymer (B'1) or (B'2), or by washing the polymerization reaction liquid with water followed by separation and drying.

The unmodified liquid diene block copolymer (B'1) or (B'2) obtained as described above may be directly (without hydrogenation) subjected to the modification with functional groups derived from a silane compound of the formula (1) described later, or may be modified after at least part of the unsaturated bonds present in the liquid diene rubber are hydrogenated.

To ensure that the functional groups derived from a silane compound of the formula (1) described later will exhibit their characteristics more favorably, the unmodified liquid diene block copolymer (B'1) or (B'2) before the modification is preferably free from modification with other functional groups (such as, for example, hydroxyl groups). When the unmodified liquid diene block copolymer (B'1) or (B'2) is free from modification with other functional groups, the modified liquid diene polymer (B1) or (B2) that is obtained tends to attain higher stability. Further, the modified liquid diene polymer (B1) or (B2) tends to exhibit higher interaction (for example, reactivity) between its functional groups derived from a silane compound represented by the formula (1) and a filler (for example, silica).

The unmodified liquid diene block copolymer (B'1) or (B'2) is used as a modified liquid diene polymer (B1) or (B2) after the modification with a functional group derived from a silane compound represented by the formula (1) below (hereinafter, also written as the silane compound (1)).

[Chem. 2]

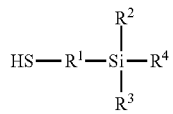

(1)

In the formula (1), $R^1$ is a $C_{1-6}$ divalent alkylene group. Examples of the $C_{1-6}$ divalent alkylene groups include methylene group, ethylene group, propylene group, butylene group, pentylene group and hexylene group. $R^2$, $R^3$ and $R^4$ are each independently a methoxy group, an ethoxy group, a phenoxy group, a methyl group, an ethyl group or a phenyl group, with the proviso that at least one of $R^2$, $R^3$ and $R^4$ is a methoxy group, an ethoxy group or a phenoxy group.

Examples of the silane compounds (1) include mercaptomethylenemethyldiethoxysilane, mercaptomethylenetriethoxysilane, 2-mercaptoethyltrimethoxysilane, 2-mercaptoethyltriethoxysilane, 2-mercaptoethylmethoxydimethylsilane, 2-mercaptoethylethoxydimethylsilane, 3-mercaptopropyltrimethoxysilane, 3-mercaptopropyltriethoxysilane, 3-mercaptopropyldimethoxymethylsilane, 3-mercaptopropyldiethoxymethylsilane, 3-mercaptopropyldimethoxyethylsilane, 3-mercaptopropyldiethoxyethylsilane, 3-mercaptopropylmethoxydimethylsilane and 3-mercaptopropylethoxydimethylsilane. The silane compounds may be used singly, or two or more may be used in combination.

The mercapto group (—SH) of the silane compound (1) is radically added to a carbon-carbon unsaturated bond present in the unmodified liquid diene block copolymer (B'1) or (B'2). The resultant modified liquid diene polymer (B1) or (B2) has a functional group derived from the silane compound (1), specifically, a functional group that is a partial structure represented by the formula (2) below. When the copolymer is the unmodified liquid diene block copolymer (B'1), this radical addition reaction probably occurs preferentially at carbon-carbon unsaturated bonds in 1,2-bonded butadiene units contained in the polymer block (b'1). In the case of the unmodified liquid diene block copolymer (B'2), the radical addition reaction probably occurs preferentially at carbon-carbon unsaturated bonds in butadiene units, in particular, 1,2-bonded butadiene units, contained in the polymer block (b"1). As a result, the modified liquid diene polymer (B1) or (B2) that is obtained has an uneven distribution of the functional groups derived from the silane compound (1) at the specific location of the polymer chain.

[Chem. 3]

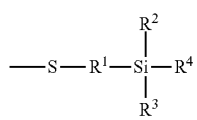

(2)

Details such as definitions and specific examples of $R^1$, $R^2$, $R^3$ and $R^4$ in the formula (2) are the same as those of $R^1$, $R^2$, $R^3$ and $R^4$ in the formula (1).

The average number of the functional groups derived from the silane compound (1) per molecule of the modified liquid diene polymer (B1) or (B2) is 1 to 20, preferably 1 to 15, more preferably 1 to 10, still more preferably 1 to 9, and particularly preferably 1 to 4. If the average number of the functional groups is less than 1, the modified liquid diene polymer (B1) or (B2) used as a component of a rubber composition described later exhibits a low affinity for a filler (C) and fails to improve the dispersibility of the filler in the rubber composition, with the result that crosslinked products of the rubber composition sometimes do not attain the desired enhancements in properties, for example, a sufficient reduction in Payne effect. If, on the other hand, the average number of the functional groups is more than 20, the degree of unevenness in the distribution of the functional groups in the modified liquid diene polymer (B1) or (B2) is lowered, and crosslinked products obtained from a rubber composition containing such a copolymer fail to attain the desired properties enhancements and tend to be deteriorated in properties, for example, the Payne effect is not reduced and abrasion resistance tends to be deteriorated. Although detailed mechanisms are not clear, it is probable that the modified liquid diene polymer (B1) or (B2) can be concentrated near a filler (C) more easily as a result of the introduction of an appropriate amount of the functional groups in the modified liquid diene polymer, and thereby effectively reinforces the filler (C) so as to offer an enhancement in abrasion resistance of crosslinked products that are obtained. Further, the modified liquid polymer (B1) or (B2) probably mediates the enhancement in affinity between a solid rubber (A) and a filler (C) to allow the filler (C) to be dispersed in the rubber composition in a state that is ideal for a crosslinked product to exhibit enhanced properties. That is, for example, the modified liquid diene polymer improves filler dispersibility. If, on the other hand, the modified liquid diene polymer contains too many functional groups, the molecules of the modified liquid diene polymer (B1) or (B2) adsorbed to a filler (C) come to interact with one another so strongly that the filler (C) is not allowed to be dispersed in the rubber composition in a state that is ideal for a crosslinked product to exhibit enhanced properties. Such an excessively modified liquid diene polymer will not contribute to enhancing the affinity between a solid rubber and a filler (C), and, for example, the filler (C) is sometimes aggregated. To ensure that crosslinked products will attain enhanced abrasion resistance and to obtain tires with enhanced rolling resistance performance, the average number of the functional groups derived from the silane compound (1) per molecule of the modified liquid diene polymer (B1) or (B2) is preferably 1 to 9.

The average number of the functional groups per molecule of the modified liquid diene polymer (B1) or (B2) may be calculated from the functional group equivalent weight (g/eq) and the styrene equivalent number average molecular weight Mn of the modified liquid diene polymer (B1) or (B2).

(Average number of functional groups per molecule)
=[(Number average molecular weight Mn)/(Molecular weight of styrene unit)×(Average molecular weight of units of conjugated dienes and optional monomers other than conjugated dienes)]/(Functional group equivalent weight)

The functional group equivalent weight of the modified liquid diene polymer (B1) or (B2) indicates the mass of the conjugated dienes and optional monomers other than conjugated dienes that are bonded together per one functional group. The functional group equivalent weight may be calculated from the ratio of the area of the peak assigned to the polymer main chains to the area of the peak assigned to the functional groups using $^1$H-NMR or $^{13}$C-NMR. The peak assigned to the functional groups is a peak assigned to alkoxy groups.

The amount of the silane compound (1) added in the modified liquid diene polymer (B1) or (B2) is preferably 1 to 60 parts by mass per 100 parts by mass of the unmodified liquid diene block copolymer (B'1) or (B'2), and is more preferably 1 to 50 parts by mass, and still more preferably 1 to 40 parts by mass. If the amount of the modifying agent added is larger than 60 parts by mass, the dispersibility of a filler (C) tends not to be effectively improved, and crosslinked products that are obtained tend to fail to attain the desired properties enhancements, for example, tend to fail to attain a sufficiently low Payne effect and tend to be deteriorated in abrasion resistance. If the amount is less than 1 part by mass, the dispersibility of a filler (C) tends not to be effectively improved and the filler (C) tends not to be allowed to be dispersed in a state that is ideal for a crosslinked product to attain enhanced properties, for example, in such a state that the Payne effect is sufficiently reduced. The amount of the silane compound (1) added in the modified liquid diene polymer (B1) or (B2) may be determined with various analyzers such as, for example, a nuclear magnetic resonance spectrometer.

The silane compound (1) may be added to the unmodified liquid diene block copolymer (B'1) or (B'2) by any method without limitation. For example, the silane compound (1) and optionally a radical catalyst as required may be added to the unmodified liquid diene block copolymer (B'1) or (B'2) and the mixture may be heated in the presence of or without an organic solvent. The radical generator that is used is not particularly limited and may be any of, among others, organic peroxides, azo compounds and hydrogen peroxide that are usually available in the market.

Examples of the organic peroxides include methyl ethyl ketone peroxide, cyclohexanone peroxide, 3,3,5-trimethylcyclohexanone peroxide, methylcyclohexanone peroxide, acetylacetone peroxide, 1,1-bis(t-butylperoxy)-3,3,5-trimethylcyclohexane, 1,1-bis(t-butylperoxy)cyclohexane, 1,1-bis(t-hexylperoxy)cyclohexane, 2,2-bis(t-butylperoxy)butane, t-butylhydroperoxide, cumenehydroperoxide, diisopropylbenzene hydroperoxide, p-menthane hydroperoxide, 2,5-dimethylhexane 2,5-dihydroperoxide, 1,1,3,3-tetramethylbutyl hydroperoxide, di-t-butyl peroxide, t-butylcumyl peroxide, dicumyl peroxide, bis(t-butylperoxyisopropyl)benzene, 2,5-dimethyl-2,5-di(t-butylperoxy)hexane, 2,5-hexanoyl peroxide, lauroyl peroxide, succinic acid peroxide, benzoyl peroxide and derivatives thereof, 2,4-dichlorobenzoyl peroxide, m-toluoyl peroxide, diisopropyl peroxydicarbonate, t-butyl-2-ethyl hexanoate, di-2-ethylhexyl peroxydicarbonate, dimethoxyisopropyl peroxycarbonate, di(3-methyl-3-methoxybutyl) peroxydicarbonate, t-butyl peroxyacetate, t-butyl peroxyivalate, t-butyl peroxyneodecanoate, t-butyl peroxyoctanoate, t-butyl peroxy-3,3,5-trimethylhexanoate, t-butyl peroxylaurate, t-butyl peroxycarbonate, t-butyl peroxybenzoate, t-butyl peroxyisobutyrate, n-butyl-4,4-di(t-butylperoxy)valerate and t-hexyl peroxyisopropyl monocarbonate.

Examples of the azo compounds include
2,2'-azobisisobutyronitrile,
1,1'-azobis(cyclohexane-1-carbonitrile),
2,2'-azobis(2-methylbutyronitrile),
2,2'-azobis(2,4-dimethylvaleronitrile),
2,2'-azobis(2,4-dimethyl-4-methoxyvaleronitrile),
2,2'-azobis(2-(2-imidazolin-2-yl)propane),
2,2'-azobis(2,4,4-trimethylpentane),
2,2'-azobis(2-methylpropane),
2,2'-azobis(2-hydroxymethylpropionitrile),
4,4'-azobis(4-cyanovaleric acid), dimethyl 2,2'-azobis(2-methylpropionate),
2-cyano-2-propylazoformamide and
2-phenylazo-4-methoxy-2,4-dimethylvaleronitrile.

Examples of the organic solvents which are generally used in the above method include hydrocarbon solvents and halogenated hydrocarbon solvents. Of the organic solvents, hydrocarbon solvents such as n-butane, n-hexane, n-heptane, cyclohexane, benzene, toluene and xylene are preferable.

For purposes such as to suppress side reactions during the addition reaction of the modifying agent by the aforementioned method, an antioxidant may be added.

Some preferred examples of the antioxidants used for such purposes include 2,6-di-t-butyl-4-methylphenol (BHT), 2,2'-methylenebis(4-methyl-6-t-butylphenol), 4,4'-thiobis(3-methyl-6-t-butylphenol), 4,4'-butylidenebis(3-methyl-6-t-butylphenol) (AO-40), 3,9-bis[1,1-dimethyl-2-[3-(3-t-butyl-4-hydroxy-5-methylphenyl)propionyloxy] ethyl]-2,4,8,10-tetraoxaspiro[5.5]undecane (AO-80), 2,4-bis [(octylthio)methyl]-6-methylphenol (Irganox 1520L), 2,4-bis[(dodecylthio)methyl]-6-methylphenol (Irganox 1726), 2-[1-(2-hydroxy-3,5-di-t-pentylphenyl)ethyl]-4,6-di-t-pentylphenyl acrylate (Sumilizer GS), 2-t-butyl-6-(3-t-butyl-2-hydroxy-5-methylbenzyl)-4-methylphenyl acrylate (Sumilizer GM), 6-t-butyl-4-[3-(2,4,8,10-tetra-t-butyldibenzo[d,f][1,3,2]dioxaphosphepin-6-yloxy)propyl]-2-methylphenol (Sumilizer GP), tris(2,4-di-t-butylphenyl) phosphite (Irgafos 168), dioctadecyl 3,3'-dithiobispropionate, hydroquinone, p-methoxyphenol, N-phenyl-N'-(1,3-dimethylbutyl)-p-phenylenediamine (Nocrac 6C), bis(2,2,6,6-tetramethyl-4-piperidyl) sebacate (LA-77Y), N, N-dioctadecylhydroxylamine (Irgastab FS 042) and bis(4-t-octylphenyl)amine (Irganox 5057). The antioxidants may be used solely, or two or more may be used in combination.

The amount of the antioxidants added is preferably 0 to 10 parts by mass, and more preferably 0 to 5 parts by mass per 100 parts by mass of the unmodified liquid diene block copolymer (B'1) or (B'2).

In the modified liquid diene polymer (B1) or (B2), the functional groups may be introduced at polymer ends or polymer side chains. The introduction sites are preferably polymer side chains in view of the fact that a plurality of functional groups can be introduced easily. The functional groups may belong to a single kind or may be a mixture of two or more kinds. That is, the modified liquid diene polymer (B1) or (B2) may be modified with a single kind of the modifying agent or with two or more kinds of the modifying agents.

The ratio in which the unmodified liquid diene block copolymer (B'1) or (B'2) and the silane compound (1) are mixed together may be selected appropriately so that, for example, the modified liquid diene polymer (B1) or (B2) will have the desired average number of the functional groups per molecule. For example, the unmodified liquid diene block copolymer (B'1) or (B'2) and the silane compound (1) may be mixed in a mass ratio (B'1)/(1) (or (B'2)/(1)) of 0.3 to 50.

An effective approach to producing the modified liquid diene polymer (B1) or (B2) with the specified properties is to react the unmodified diene copolymer with the silane compound (1) by radical addition reaction at an appropriate reaction temperature for a sufficient amount of reaction time. For example, the addition reaction of the silane compound (1) to the unmodified liquid diene block copolymer (B'1) or (B'2) preferably takes place at a temperature of 10 to 200° C., and more preferably 50° C. to 180° C. The reaction time is preferably 1 to 200 hours, more preferably 1 to 100 hours, and still more preferably 1 to 50 hours.

The melt viscosity of the modified liquid diene polymer (B1) or (B2) at 38° C. is preferably 0.1 to 4,000 Pa·s, more preferably 0.1 to 3,500 Pa·s, and still more preferably 0.1 to 3,000 Pa·s. When the melt viscosity of the modified liquid diene polymer (B1) or (B2) is in the above range, the material is liquid at room temperature and is therefore easy to handle, and further a rubber composition that is obtained attains enhanced flexibility and thus exhibits higher processability. The liquid diene polymer (B1) or (B2) having this specific melt viscosity may be effectively synthesized by adding a radical catalyst during the modification reaction and performing the reaction at a low reaction temperature for a short time. In the present invention, the melt viscosity of the liquid diene polymer (B1) or (B2) is a value measured with a Brookfield viscometer at 38° C.

The weight average molecular weight (Mw) of the modified liquid diene polymer (B1) or (B2) is not less than 1,000 and not more than 120,000, preferably not less than 2,000 and not more than 100,000, and more preferably not less than 3,000 and not more than 80,000. In the present invention, the Mw of the liquid diene polymer (B1) or (B2) is the weight average molecular weight measured by gel permeation chromatography (GPC) relative to polystyrenes. When the Mw of the modified liquid diene polymer (B1) or (B2) is in the above range, the material is liquid at room temperature, and is therefore easy to handle and exhibits excellent process flow efficiency during production, thus offering good economic efficiency. Further, good processability is attained of a rubber composition of the present invention. Furthermore, such a modified liquid diene polymer attains enhanced affinity for a filler (C) described later in the obtainable rubber composition and thus can be located more easily near the filler (C) during the preparation of the rubber composition. Probably as a result of these, the polymer allows the filler (C) to be dispersed in the rubber composition in a state that is ideal for a crosslinked product to attain enhanced properties (for example, the polymer contributes to enhancing the dispersibility of the filler (C)). Thus, in some cases, the Payne effect of a crosslinked product is sufficiently lowered, and the filler (C) exhibits excellent dispersibility in the crosslinked product. Further, as a result of the facilitated access of the modified liquid polymer (B1) or (B2) to the vicinity of the filler (C), crosslinked products with excellent abrasion resistance are obtained. By virtue of these advantages, articles such as, for example, tires formed of crosslinked products of the composition exhibit satisfactory properties such as wet grip. In the present invention, two or more kinds of the modified liquid diene polymers (B1) or (B2) having different molecular weights Mw may be used in combination. Further, two or more kinds of the liquid diene polymers (B1) and (B2) may be used in combination.

The molecular weight distribution (Mw/Mn) of the modified liquid diene polymer (B1) or (B2) is preferably 1.0 to 20.0, more preferably 1.0 to 15.0, still more preferably 1.0 to 10.0, further preferably 1.0 to 5.0, and particularly preferably 1.0 to 2.0. This Mw/Mn is more advantageous in that the obtainable modified liquid diene polymer (B1) or (B2) has a small variation in viscosity. The liquid diene polymer (B1) or (B2) having this specific Mw/Mn may be effectively synthesized by adding a radical catalyst during the modification reaction and performing the reaction at a low reaction temperature for a short time. The molecular weight distribution (Mw/Mn) is the ratio of weight average molecular weight (Mw) to number average molecular weight (Mn) measured by GPC relative to polystyrene standards.

The modified liquid diene polymer (B1) or (B2) of the present invention has a functional group derived from the silane compound represented by the formula (1), and the average number of the functional groups per molecule of the modified liquid diene polymer (B) is in the range of 1 to 20. Preferably, the modified liquid diene polymer (B) is a linear polymer, and not less than 65% of the functional groups derived from the silane compound are present in a region or regions extending from one end or both ends to 45% in total of all the chain length of the modified liquid diene polymer (B). Here, phrases such as "X % in total of all the chain length" mean that X is the total of X1+X2 wherein X1 is an extent in percentage to which a region extends from one of the ends of the linear polymer and X2 is an extent in percentage to which a region extends from the other end of the linear polymer. Either X1 or X2 may be 0%. The lengths of the polymer blocks in the block copolymer may be obtained by determining the respective numbers of the monomer units contained in the block copolymer by $^1$H-NMR measurement and calculating the lengths assuming that the bond length of a carbon-carbon single bond in the main chain of the block copolymer is 150 pm, the bond length of a carbon-carbon double bond is 135 pm, and the bond angle is 120°. To determine how much of the functional groups derived from the silane compound that are contained in the modified liquid diene polymer (B) are present in a region or regions extending from one end or both ends to 45% in total of all the chain length, $^1$H-NMR measurement may be performed to identify the numerical proportion of 1,2-bonded butadiene units highly reactive with the silane compound that are present in the above region(s).

In a rubber composition of the present invention, the modified liquid diene polymer (B1) or (B2) has a high affinity for a filler (C) described later and thus will be concentrated near the filler (C) to highly reinforce the filler (C). Further, the modified liquid diene polymer will contribute to enhancing the compatibility between a filler (C) and a solid rubber (A). Thus, the filler (C) is allowed to be dispersed in the rubber composition in a state that is ideal for a crosslinked product of the rubber composition to attain enhanced properties. For example, the filler (C) attains excellent dispersibility in the rubber composition, and the Payne effect of a crosslinked product obtained from the rubber composition is sufficiently lowered in some cases. Further, crosslinked products of the rubber composition attain excellent mechanical strength such as abrasion resistance, and wet grip. Thus, such crosslinked products perform excellently in these properties when used as, for example, tires or the like.

The modified liquid diene polymers (B1) or (B2) may be used solely, or two or more may be used in combination. Further, the modified liquid diene polymers (B1) and (B2) may be used in combination.

In the modified liquid diene polymer (B1) or (B2), the catalyst residue content ascribed to the polymerization catalyst used in the production of the polymer is preferably in the range of 0 to 200 ppm in terms of metal. When, for example, the polymerization catalyst used for the production of the unmodified liquid diene polymer (B'), which is the raw material for the modified liquid diene polymer (B), is an organoalkali metal such as an organolithium compound, the metal based on which the catalyst residue content is determined is the alkali metal such as lithium. The catalyst residue content in the above range ensures that a decrease in tackiness during processing or the like will be avoided and that a rubber composition of the present invention will give crosslinked products attaining enhancements in heat resistance and rolling resistance performance of tires. The catalyst residue content ascribed to the polymerization catalyst used in the production of the modified liquid diene polymer (B) is more preferably 0 to 150 ppm, and still more preferably 0 to 100 ppm in terms of metal. The catalyst residue content may be measured with, for example, a polarized Zeeman atomic absorption spectrophotometer.

For example, the catalyst residue content in the liquid diene polymer may be controlled to the above specific range by purifying the modified liquid diene polymer (B1) or (B2) or the unmodified liquid diene polymer (B'1) or (B'2) as the raw material to remove sufficiently the catalyst residue. The purification method is preferably washing with water or warm water, an organic solvent such as methanol or acetone, or supercritical fluid carbon dioxide. From the economic viewpoint, the number of washing operations is preferably 1 to 20 times, and more preferably 1 to 10 times. The washing temperature is preferably 20 to 100° C., and more preferably 40 to 90° C. Prior to the polymerization reaction, the monomers may be purified by distillation or with an adsorbent to remove impurities that will inhibit the polymerization. Such purification allows the polymerization to take place with a reduced amount of the polymerization catalyst, thus making it possible to reduce the catalyst residue content. From the similar viewpoint, the catalyst residue content in a rubber composition of the invention including a solid rubber (A), the modified liquid diene polymer (B1) or (B2) and a filler (C) is preferably 0 to 200 ppm, more preferably 0 to 150 ppm, and still more preferably 0 to 100 ppm in terms of metal. In this case, the catalyst residue content may include a catalyst residue content ascribed to the polymerization catalyst used in the production of the solid rubber (A), the modified liquid diene polymer (B1) or (B2) and/or other components optionally used in the rubber composition.

[Rubber Compositions]

A rubber composition of the present invention includes 100 parts by mass of a solid rubber (A), 0.1 to 50 parts by mass of the modified liquid diene polymer (B) described hereinabove, and 20 to 200 parts by mass of a filler (C).

[Solid Rubbers (A)]

The solid rubber (A) used in the rubber composition of the present invention is a rubber that can be handled as a solid at 20° C. The Mooney viscosity $ML_{1+4}$ of the solid rubber (A) at 100° C. is usually in the range of 20 to 200. Examples of the solid rubbers (A) include natural rubbers, styrene butadiene rubbers (hereinafter, also written as "SBRs"), butadiene rubbers, isoprene rubbers, butyl rubbers, halogenated butyl rubbers, ethylene propylene diene rubbers, butadiene acrylonitrile copolymer rubbers, chloroprene rubbers, acrylic rubbers, fluororubbers and urethane rubbers. Of these solid rubbers (A), natural rubbers, SBRs, butadiene rubbers and isoprene rubbers are preferable, and natural rubbers and SBRs are more preferable. The solid rubbers (A) may be used solely, or two or more may be used in combination.

To ensure that the obtainable rubber composition and crosslinked products will exhibit desired properties sufficiently, the number average molecular weight (Mn) of the solid rubber (A) is preferably not less than 80,000, and more preferably in the range of 100,000 to 3,000,000. In the present specification, the number average molecular weight is a polystyrene equivalent number average molecular weight measured by gel permeation chromatography (GPC).

Examples of the natural rubbers include those natural rubbers generally used in the tire industry, with specific examples including TSRs (technically specified rubbers) such as SMRs (TSRs from Malaysia), SIRs (TSRs from Indonesia) and STRs (TSRs from Thailand), and RSSs (ribbed smoked sheets), high-purity natural rubbers and modified natural rubbers such as epoxidized natural rubbers, hydroxylated natural rubbers, hydrogenated natural rubbers and grafted natural rubbers. In particular, SMR 20, STR 20 and RSS #3 are preferable from the points of view of stable quality and high availability. The natural rubbers may be used solely, or two or more may be used in combination.

The SBRs may be any such rubbers generally used in tire applications. Specifically, those rubbers having a styrene content of 0.1 to 70 mass % are preferable, and the styrene content is more preferably 5 to 50 mass %, and still more preferably 15 to 35 mass %. Further, those rubbers having a vinyl content of 0.1 to 60 mass % are preferable, and the vinyl content is more preferably 0.1 to 55 mass %.

The weight average molecular weight (Mw) of the SBRs is preferably 100,000 to 2,500,000, more preferably 150,000 to 2,000,000, and still more preferably 200,000 to 1,500,000. This molecular weight ensures that processability and mechanical strength are satisfied at the same time. In the present specification, the weight average molecular weight is the polystyrene equivalent weight average molecular weight measured by gel permeation chromatography (GPC).

The SBRs used in the invention preferably have a glass transition temperature of −95 to 0° C., and more preferably −95 to −5° C. as measured by differential thermal analysis. With this glass transition temperature, the SBR exhibits a viscosity that is easy to handle.

SBR which may be used in the invention may be obtained by copolymerizing styrene and butadiene. The SBR production process is not particularly limited and may be any of emulsion polymerization, solution polymerization, gas-phase polymerization and bulk polymerization. Of these production processes, emulsion polymerization and solution polymerization are preferable.

An emulsion-polymerized styrene butadiene rubber (hereinafter, also written as E-SBR) may be produced by a usual emulsion polymerization process that is known or is deemed as known. For example, such a rubber may be obtained by emulsifying and dispersing prescribed amounts of styrene and butadiene monomers in the presence of an emulsifier and emulsion polymerizing the monomers with a radical polymerization initiator.

A solution-polymerized styrene butadiene rubber (hereinafter, also written as S-SBR) may be produced by a usual solution polymerization process. For example, styrene and butadiene are polymerized in a solvent with an active metal capable of catalyzing anionic polymerization optionally in the presence of a polar compound as desired.

Examples of the solvents include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene and toluene. It is usually preferable to use the solvent in such an amount that the monomer concentration will be 1 to 50 mass %.

Examples of the active metals capable of catalyzing anionic polymerization include alkali metals such as lithium, sodium and potassium; alkaline earth metals such as beryllium, magnesium, calcium, strontium and barium; and lanthanoid rare earth metals such as lanthanum and neodymium. Of these active metals, alkali metals and alkaline earth metals are preferable, and alkali metals are more preferable. Of the alkali metals, organoalkali metal compounds are more preferably used.

Examples of the organoalkali metal compounds include organomonolithium compounds such as n-butyllithium, sec-butyllithium, t-butyllithium, hexyllithium, phenyllithium and stilbenelithium; polyfunctional organolithium compounds such as dilithiomethane, 1,4-dilithiobutane, 1,4-dilithio-2-ethylcyclohexane and 1,3,5-trilithiobenzene; sodium naphthalene and potassium naphthalene. In particular, organolithium compounds are preferable, and organomonolithium compounds are more preferable. The amount in which the organoalkali metal compounds are used may be determined appropriately in accordance with the desired molecular weight of S-SBR. The organoalkali metal compound may be used in the form of an organoalkali metal amide by being subjected to a reaction with a secondary amine such as dibutylamine, dihexylamine or dibenzylamine.

The polar compounds are not particularly limited as long as the compounds do not deactivate the anionic polymerization reaction and are generally used for the purposes of controlling the microstructure of butadiene moieties and controlling the distribution of styrene in copolymer chains. Examples include ether compounds such as dibutyl ether, tetrahydrofuran and ethylene glycol diethyl ether; tertiary amines such as tetramethylethylenediamine and trimethylamine; alkali metal alkoxides and phosphine compounds.

The temperature of the polymerization reaction is usually in the range of −80 to 150° C., preferably 0 to 100° C., and more preferably 30 to 90° C. The polymerization mode may be batchwise or continuous. To enhance the random copolymerizability of styrene and butadiene, it is preferable to supply styrene and butadiene into the reaction liquid continuously or intermittently so that styrene and butadiene in the polymerization system will have a specific composition ratio.

The polymerization reaction may be terminated by the addition of an alcohol such as methanol or isopropanol as a polymerization terminator. After the termination of the polymerization reaction, the target S-SBR may be recovered by separating the solvent from the polymerization solution by a method such as direct drying or steam stripping. The polymerization solution may be mixed together with an extender oil before the removal of the solvent, and the rubber may be recovered as an oil-extended rubber.

As long as the advantageous effects of the invention are not impaired, the SBR may be a modified SBR obtained by introducing functional groups into SBR. Examples of the functional groups include amino groups, alkoxysilyl groups, hydroxyl groups, epoxy groups and carboxyl groups.

For example, the modified SBR may be produced by adding, before the addition of the polymerization terminator, an agent capable of reacting with active ends of the polymer, for example, a coupling agent such as tin tetrachloride, tetrachlorosilane, dimethyldichlorosilane, dimethyldiethoxysilane, tetramethoxysilane, tetraethoxysilane, 3-aminopropyltriethoxysilane, tetraglycidyl-1,3-bisaminomethylcyclohexane or 2,4-tolylene diisocyanate, a chain end-modifying agent such as 4,4'-bis(diethylamino)benzophenone or N-vinylpyrrolidone, or any of modifying agents described in JP-A-2011-132298. In the modified SBR, the functional groups may be introduced at polymer ends or polymer side chains.

Examples of the butadiene rubbers include commercially available butadiene rubbers polymerized with Ziegler catalysts such as titanium tetrahalide-trialkylaluminum systems, diethylaluminum chloride-cobalt systems, trialkylaluminum-boron trifluoride-nickel systems and diethylaluminum chloride-nickel systems; lanthanoid rare earth metal catalysts such as triethylaluminum-organic acid neodymium-Lewis acid systems; or organoalkali metal compounds similarly to the S-SBRs. Ziegler-catalyzed butadiene rubbers are preferable because they have a high cis content. Use may be made of ultrahigh cis butadiene rubbers obtained using lanthanoid rare earth metal catalysts.

The vinyl content in the butadiene rubbers is preferably not more than 50 mass %, more preferably not more than 40 mass %, and still more preferably not more than 30 mass %. If the vinyl content exceeds 50 mass %, the rolling resistance performance tends to deteriorate. The lower limit of the vinyl content is not particularly limited. The glass transition temperature, although variable depending on the vinyl content, is preferably not more than −40° C., and more preferably not more than −50° C.

The weight average molecular weight (Mw) of the butadiene rubbers is preferably 90,000 to 2,000,000, and more preferably 150,000 to 1,500,000. This Mw ensures that good processability and mechanical strength are obtained.

As long as the advantageous effects of the present invention are not impaired, a part of the butadiene rubbers may have branched structures or polar functional groups that are introduced by using polyfunctional modifiers, for example, tin tetrachloride, silicon tetrachloride, alkoxysilanes having an epoxy group in the molecule, or amino group-containing alkoxysilanes.

Examples of the isoprene rubbers include commercially available isoprene rubbers polymerized with Ziegler catalysts such as titanium tetrahalide-trialkylaluminum systems, diethylaluminum chloride-cobalt systems, trialkylaluminum-boron trifluoride-nickel systems and diethylaluminum chloride-nickel systems; lanthanoid rare earth metal catalysts such as triethylaluminum-organic acid neodymium-Lewis acid systems; or organoalkali metal compounds similarly to the S-SBRs. Ziegler-catalyzed isoprene rubbers are preferable because they have a high cis content. Use may be made of ultrahigh cis isoprene rubbers obtained using lanthanoid rare earth metal catalysts.

The vinyl content in the isoprene rubbers is preferably not more than 50 mass %, more preferably not more than 40 mass %, and still more preferably not more than 30 mass %. If the vinyl content exceeds 50 mass %, the rolling resistance performance tends to deteriorate. The lower limit of the vinyl content is not particularly limited. The glass transition temperature, although variable depending on the vinyl content, is preferably not more than −20° C., and more preferably not more than −30° C.

The weight average molecular weight (Mw) of the isoprene rubbers is preferably 90,000 to 2,000,000, and more preferably 150,000 to 1,500,000. This Mw ensures that high processability and mechanical strength are obtained.

As long as the advantageous effects of the invention are not impaired, a part of the isoprene rubbers may have branched structures or polar functional groups that are introduced by using polyfunctional modifiers, for example, tin tetrachloride, silicon tetrachloride, alkoxysilanes having an epoxy group in the molecule, or amino group-containing alkoxysilanes.

In the rubber composition of the present invention, the content of the modified liquid diene polymer (B) is 0.1 to 50 parts by mass per 100 parts by mass of the solid rubber (A), and is preferably 0.1 to 45 parts by mass, more preferably 0.5 to 40 parts by mass, still more preferably 1 to 40 parts by mass, and further preferably 2 to 40 parts by mass. This content of the modified liquid diene polymer (B) ensures that the filler (C) will be dispersed in an ideal state in the rubber composition (for example, in such a state that the Payne effect will be effectively lowered in crosslinked products that are obtained), and the crosslinked products will exhibit enhanced abrasion resistance and, when used in, for example, tires and the like, will show good performances such as steering stability and rolling resistance performance.

[Fillers (C)]

Examples of the fillers (C) used in the rubber composition of the present invention include inorganic fillers such as carbon blacks, silicas, clays, micas, calcium carbonate, magnesium hydroxide, aluminum hydroxide, barium sulfate, titanium oxides, glass fibers, fibrous fillers and glass balloons; and organic fillers such as resin particles, wood powders and cork powders. The incorporation of such fillers into the rubber composition makes it possible to attain improvements in properties such as mechanical strength, heat resistance and weather resistance, to control the hardness and to increase the bulk of the rubber. From points of view such as improvements in properties such as mechanical strength, carbon blacks and silicas are preferable as the fillers (C).

Examples of the carbon blacks include furnace blacks, channel blacks, thermal blacks, acetylene blacks and Ketjen blacks. From the point of view of enhancing the crosslinking rate and the mechanical strength, furnace blacks are preferable among the above carbon blacks. The carbon blacks may be used solely, or two or more may be used in combination.

To attain enhancements in properties such as dispersibility, mechanical strength and hardness, the average particle diameter of the carbon blacks is preferably 5 to 100 nm, more preferably 5 to 80 nm, and still more preferably 5 to 70 nm. The average particle diameter of the carbon blacks may be determined by measuring the diameters of the particles with a transmission electron microscope and calculating the average of the diameters.

Examples of the commercially available furnace blacks include "DIABLACK" manufactured by Mitsubishi Chemical Corporation and "SEAST" manufactured by Tokai Carbon Co., Ltd. Examples of the commercially available acetylene blacks include "DENKA BLACK" manufactured by Denka Company Limited. Examples of the commercially available Ketjen blacks include "ECP600JD" manufactured by Lion Specialty Chemicals Co., Ltd.

To attain enhancements in properties such as the wettability and dispersibility to the solid rubber (A), the carbon blacks may be treated with acids such as nitric acid, sulfuric acid, hydrochloric acid and mixed acids of these acids, or may be subjected to surface oxidation treatment by heating in the presence of air. To enhance the mechanical strength of the rubber composition of the present invention and crosslinked products obtained from the composition, the carbon blacks may be heat treated at 2,000 to 3,000° C. in the presence of a graphitization catalyst. Preferred examples of the graphitization catalysts include boron, boron oxides (for example, $B_2O_2$, $B_2O_3$, $B_4O_3$ and $B_4O_5$), boron oxoacids (for example, orthoboric acid, metaboric acid and tetraboric acid) and salts thereof, boron carbides (for example, $B_4C$ and $B_6C$), boron nitride (BN) and other boron compounds.

The carbon blacks may be used after their particle size is adjusted by a technique such as crushing. Examples of the grinders which may be used for the crushing of the carbon blacks include high-speed rotary crushers (hammer mills, pin mills and cage mills), various ball mills (rotary mills, vibration mills and planetary mills) and stirring mills (bead mills, Attritor mills, flow tube type mills and annular mills).

Examples of the silicas include wet silicas (hydrous silicates), dry silicas (silicic anhydrides), calcium silicates and aluminum silicates. Of these silicas, wet silicas are preferable to attain further enhancements in processability, mechanical strength and abrasion resistance. The silicas may be used solely, or two or more may be used in combination.

To attain enhancements in processability, rolling resistance performance, mechanical strength and abrasion resistance, the average particle diameter of the silicas is preferably 0.5 to 200 nm, more preferably 5 to 150 nm, and still more preferably 10 to 100 nm. The average particle diameter of the silicas may be determined by measuring the diameters of the particles with a transmission electron microscope and calculating the average of the diameters.

The silicas are more preferable as the fillers (C) from points of view such as enhancements in the rolling resistance performance of the obtainable rubber composition and crosslinked products thereof.

In the rubber composition of the present invention, the content of the filler (C) is 20 to 200 parts by mass with respect to 100 parts by mass of the solid rubber (A), and is preferably 20 to 180 parts by mass, and more preferably 25 to 150 parts by mass. This content of the filler (C) ensures that the processability, the rolling resistance performance, the mechanical strength and the abrasion resistance are enhanced.

When any fillers other than the silicas and the carbon blacks are used as the fillers (C), the content thereof is preferably 20 to 120 parts by mass with respect to 100 parts by mass of the solid rubber (A), and is more preferably 20 to 90 parts by mass, and still more preferably 20 to 80 parts by mass.

The fillers (C) may be used solely, or two or more may be used in combination.

[Additional Components]

The rubber composition of the present invention may further include a crosslinking agent (D) for the crosslinking of the rubber. Examples of the crosslinking agents (D) include sulfur, sulfur compounds, oxygen, organic peroxides, phenolic resins, amino resins, quinone and quinone dioxime derivatives, halogen compounds, aldehyde compounds, alcohol compounds, epoxy compounds, metal halides and organometal halides, and silane compounds. Examples of the sulfur compounds include morpholine disulfide and alkylphenol disulfides. Examples of the organic peroxides include cyclohexanone peroxide, methyl acetoacetate peroxide, t-butyl peroxyisobutyrate, t-butyl peroxybenzoate, benzoyl peroxide, lauroyl peroxide, dicumyl peroxide, di-t-butyl peroxide and 1,3-bis(t-butylperoxyisopropyl)benzene. The crosslinking agents (D) may be used solely, or two or more may be used in combination. From the point of view of the mechanical properties of crosslinked products, the content of the crosslinking agent (D) is usually 0.1 to 10 parts by mass with respect to 100 parts by mass of the solid rubber (A), and is preferably 0.5 to 10 parts by mass, and more preferably 0.8 to 5 parts by mass.

When the rubber composition of the present invention contains, for example, sulfur, a sulfur compound or the like as the crosslinking agent (D) for the crosslinking (vulcanization) of the rubber, the composition may further include a vulcanization accelerator (E). Examples of the vulcanization accelerators (E) include guanidine compounds, sulfenamide compounds, thiazole compounds, thiuram compounds, thiourea compounds, dithiocarbamic acid compounds, aldehyde-amine compounds, aldehyde-ammonia compounds, imidazoline compounds and xanthate compounds. The vulcanization accelerators (E) may be used solely, or two or more may be used in combination. The vulcanization accelerators (E) are usually used in an amount of 0.1 to 15 parts by mass, and preferably 0.1 to 10 parts by mass with respect to 100 parts by mass of the solid rubber (A).

When the rubber composition of the present invention contains, for example, sulfur, a sulfur compound or the like as the crosslinking agent (D) for the crosslinking (vulcanization) of the rubber, the composition may further include a vulcanization aid (F). Examples of the vulcanization aids (F) include fatty acids such as stearic acid, metal oxides such as zinc oxide, and fatty acid metal salts such as zinc stearate. The vulcanization aids (F) may be used solely, or two or more may be used in combination. The vulcanization aids (F) are usually used in an amount of 0.1 to 15 parts by mass, and preferably 1 to 10 parts by mass with respect to 100 parts by mass of the solid rubber (A).

When the rubber composition of the present invention contains a silica as the filler (C), it is preferable that the composition further include a silane coupling agent. Examples of the silane coupling agents include sulfide compounds, mercapto compounds, vinyl compounds, amino compounds, glycidoxy compounds, nitro compounds and chloro compounds.

Examples of the sulfide compounds include bis(3-triethoxysilylpropyl) tetrasulfide, bis(2-triethoxysilylethyl) tetrasulfide, bis(3-trimethoxysilylpropyl) tetrasulfide, bis(2-trimethoxysilylethyl) tetrasulfide, bis(3-triethoxysilylpropyl) trisulfide, bis(3-trimethoxysilylpropyl) trisulfide, bis(3-triethoxysilylpropyl) disulfide, bis(3-trimethoxysilylpropyl) disulfide, 3-trimethoxysilylpropyl-N,N-dimethylthiocarbamoyl tetrasulfide, 3-triethoxysilylpropyl-N,N-dimethylthiocarbamoyl tetrasulfide, 2-trimethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide and 3-octanoylthio-1-propyltriethoxysilane.

Examples of the mercapto compounds include
3-mercaptopropyltrimethoxysilane,
3-mercaptopropyltriethoxysilane,
2-mercaptoethyltrimethoxysilane and
2-mercaptoethyltriethoxysilane.
Examples of the vinyl compounds include vinyltriethoxysilane and vinyltrimethoxysilane.
Examples of the amino compounds include 3-aminopropyltriethoxysilane, 3-aminopropyltrimethoxysilane, 3-(2-aminoethyl)aminopropyltriethoxysilane and 3-(2-aminoethyl)aminopropyltrimethoxysilane.
Examples of the glycidoxy compounds include
γ-glycidoxypropyltriethoxysilane,
γ-glycidoxypropyltrimethoxysilane,
γ-glycidoxypropylmethyldiethoxysilane and
γ-glycidoxypropylmethyldimethoxysilane.
Examples of the nitro compounds include
3-nitropropyltrimethoxysilane and
3-nitropropyltriethoxysilane.
Examples of the chloro compounds include
3-chloropropyltrimethoxysilane,
3-chloropropyltriethoxysilane,
2-chloroethyltrimethoxysilane and
2-chloroethyltriethoxysilane.
Other compounds may be also used, with examples including octyltriethoxysilane, methyltriethoxysilane, methyltrimethoxysilane and hexadecyltrimethoxysilane.

The silane coupling agents may be used solely, or two or more may be used in combination. Of the above silane coupling agents, bis(3-triethoxysilylpropyl) disulfide, bis(3-triethoxysilylpropyl) tetrasulfide and 3-mercaptopropyltrimethoxysilane are preferable because the addition of these compounds provides high effects and is cost-effective.

The content of the silane coupling agent is preferably 0.1 to 30 parts by mass with respect to 100 parts by mass of the silica, and is more preferably 0.5 to 20 parts by mass, and still more preferably 1 to 15 parts by mass. This content of the silane coupling agent ensures that dispersibility, coupling effects, reinforcing effects and abrasion resistance are enhanced.

Where necessary, the rubber composition of the present invention may include softeners in order to attain improvements in properties such as processability and fluidity while still ensuring that the advantageous effects of the invention are not impaired. Examples of the softeners include process oils such as silicone oils, aromatic oils, TDAEs (treated distilled aromatic extracts), MESs (mild extracted solvates), RAEs (residual aromatic extracts), paraffin oils and naphthenic oils, and resin components such as aliphatic hydrocarbon resins, alicyclic hydrocarbon resins, C9 resins, rosin resins, coumarone-indene resins and phenolic resins. When the rubber composition of the present invention contains the process oil as the softener, the content thereof is preferably less than 50 parts by mass with respect to 100 parts by mass of the solid rubber (A).

The rubber composition of the present invention may contain additives as required in order to attain enhancements in properties such as weather resistance, heat resistance and oxidation resistance, while still achieving the advantageous effects of the invention. Examples of such additives include antioxidants, waxes, oxidation inhibitors, lubricants, light stabilizers, scorch inhibitors, processing aids, colorants such as pigments and coloring matters, flame retardants, antistatic agents, matting agents, antiblocking agents, UV absorbers, release agents, foaming agents, antibacterial agents, mildew-proofing agents and perfumes. Examples of the oxidation inhibitors include hindered phenol compounds, phosphorus compounds, lactone compounds and hydroxyl compounds. Examples of the antioxidants include amine-ketone compounds, imidazole compounds, amine compounds, phenolic compounds, sulfur compounds and phosphorus compounds. The additives may be used solely, or two or more may be used in combination.

[Methods for Producing Rubber Compositions]

The rubber composition of the present invention may be produced by any methods without limitation as long as the components can be mixed homogeneously. Examples of the apparatuses used in the production of the rubber composition include tangential or intermeshing internal kneaders such as kneader-ruders, Brabender mixers, Banbury mixers and internal mixers, single-screw extruders, twin-screw extruders, mixing rolls and rollers. The production of the rubber composition may be usually carried out at a temperature in the range of 70 to 270° C.

[Crosslinked Products]

Crosslinked products may be obtained by crosslinking the rubber composition of the present invention. The conditions under which the rubber composition is crosslinked may be selected appropriately in accordance with factors such as use applications. When, for example, the rubber composition is crosslinked (vulcanized) in a mold with use of sulfur or a sulfur compound as the crosslinking agent, the crosslinking (vulcanization) may be usually performed at a crosslinking temperature of 120 to 200° C. and a pressure of 0.5 to 2.0 MPa.

The crosslinked products are preferably such that the modified liquid diene polymer (B) is extracted therefrom with an extraction ratio of not more than 20 mass %, more preferably not more than 15 mass %, and still more preferably not more than 10 mass %.

The extraction ratio may be calculated by soaking 2 g of the crosslinked product into 400 mL of toluene at 23° C. for 48 hours and determining the amount of the modified liquid diene polymer (B) extracted into toluene.

The rubber composition of the present invention and the crosslinked products of the rubber composition may be used to constitute at least portions of tires. Such tires exhibit excellent rolling resistance performance and have high abrasion resistance by virtue of the filler (C) being dispersed in an ideal state (for example, in such a state that the Payne effect is sufficiently reduced).

Examples of the portions of tires in which the rubber composition and crosslinked products of the rubber composition may be used include treads (cap treads, undertreads), sidewalls, rubber reinforcing layers (such as liners) for runflat tires, rim cushions, bead fillers, bead insulations, bead apexes, clinch apexes, belts, belt cushions, breakers, breaker cushions, chafers, chafers pads and strip apexes.

EXAMPLES

The present invention will be described in further detail by presenting Examples hereinbelow without limiting the scope of the invention to such Examples.

The following are the components used in Examples and Comparative Examples.

⟨Solid Rubbers (A)⟩

Solution-polymerized styrene butadiene rubber: HPR355 (manufactured by JSR CORPORATION, alkoxysilyl group introduced at molecular terminal, styrene content: 28 mass %, vinyl content: 56 mass %)

Butadiene rubber: BRO1 (manufactured by JSR CORPORATION, Mw: 550,000, cis content: 95 mass %)

⟨Modified Liquid Diene Polymers (B)⟩

Modified liquid diene polymers obtained in Production Examples 1 to 11 described later ⟨Filler (C)⟩

Silica: ULTRASIL 7000GR (manufactured by Evonik Degussa Japan, wet silica, average particle size: 14 nm)

⟨Crosslinking Agent (D)⟩

Sulfur (sulfur fine powder 200 mesh, manufactured by Tsurumi Chemical Industry Co., Ltd.)

⟨Vulcanization Accelerators (E)⟩

Vulcanization accelerator (1): Nocceler CZ-G (manufactured by Ouchi Shinko Chemical Industrial Co., Ltd.)

Vulcanization accelerator (2): Nocceler D (manufactured by Ouchi Shinko Chemical Industrial Co., Ltd.)

Vulcanization accelerator (3): Nocceler TBT-N (manufactured by Ouchi Shinko Chemical Industrial Co., Ltd.)

⟨Vulcanization Aids (F)⟩

Stearic acid: LUNAC S-20 (manufactured by Kao Corporation)

Zinc oxide: Zinc oxide (manufactured by Sakai Chemical Industry Co., Ltd.)

⟨Optional Components⟩

TDAE: VivaTec 500 (manufactured by H&R)

Silane coupling agent (1): Si-75 (manufactured by Evonik Degussa Japan)

Antioxidant (1): Nocrac 6C (manufactured by Ouchi Shinko Chemical Industrial Co., Ltd.)

Wax: SUNTIGHT S (manufactured by Seiko Chemical Co., Ltd.)

Production Example 1: Production of Modified Liquid Diene Polymers (B-1 and B-2)

A thoroughly dried 5 L autoclave was purged with nitrogen and was loaded with 1860 g of cyclohexane and 61 g of s-butyllithium (1.0 mol/L cyclohexane solution). After the temperature had been increased to 50° C., 5.8 g of tetrahydrofuran was added, and thereafter 1175 g of isoprene and 219 g of butadiene were sequentially added and polymerized while performing stirring and while controlling the polymerization temperature at 50° C. The polymerization reaction was terminated by the addition of methanol. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. The polymer solution after the washing operation was dried at 140° C. for 3 hours. Thus, an unmodified liquid diene polymer (B'-1) was obtained which was a linear diblock copolymer composed of an isoprene homopolymer block and a butadiene homopolymer block.

Subsequently, a 1 L volume autoclave was loaded with 490 g of the unmodified liquid diene polymer (B'-1) obtained above, and the system was deaerated with nitrogen while performing stirring at 60° C. for 3 hours. There were added 1.8 g of 1,1-bis(t-hexylperoxy)cyclohexane and 28 g of (3-mercaptopropyl)triethoxysilane. The reaction was performed at 105° C. for 8 hours. Thus, a modified liquid diene polymer (B-1) was obtained which was a linear diblock copolymer composed of an isoprene homopolymer block and a butadiene homopolymer block and was modified with a functional group derived from the silane compound (1). In this block copolymer, the butadiene homopolymer block had been preferentially modified with a functional group derived from the silane compound (1) due to its higher reactivity with the silane compound (1).

Separately from the production of the polymer (B-1) in the autoclave described above, another 1 L volume autoclave was loaded with 440 g of the unmodified liquid diene polymer (B'-1), and the system was deaerated with nitrogen while performing stirring at 60° C. for 3 hours. There were added 1.6 g of 1,1-bis(t-hexylperoxy)cyclohexane and 21 g of (3-mercaptopropyl)triethoxysilane. The reaction was performed at 105° C. for 8 hours. Thus, a modified liquid diene polymer (B-2) was obtained which was a linear diblock copolymer composed of an isoprene homopolymer block and a butadiene homopolymer block and was modified with a functional group derived from the silane compound (1). In this block copolymer, the butadiene homopolymer block had been preferentially modified with a functional group derived from the silane compound (1) due to its higher reactivity with the silane compound (1).

Production Example 2: Production of Modified Liquid Diene Polymers (B-3 and B-13)

A thoroughly dried 5 L autoclave was purged with nitrogen and was loaded with 1860 g of cyclohexane and 57 g of s-butyllithium (1.1 mol/L cyclohexane solution). After the temperature had been increased to 50° C., 5.8 g of tetrahydrofuran was added, and thereafter 116 g of butadiene, 1087 g of isoprene and 83 g of butadiene were sequentially added and polymerized while performing stirring and while controlling the polymerization temperature at 50° C. The polymerization reaction was terminated by the addition of methanol. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. The polymer solution after the washing operation was dried at 140° C. for 3 hours. Thus, an unmodified liquid diene polymer (B'-2) was obtained which was a linear triblock copolymer composed of a butadiene homopolymer block, an isoprene homopolymer block and a butadiene homopolymer block.

Subsequently, a 1 L volume autoclave was loaded with 490 g of the unmodified liquid diene polymer (B'-2) obtained above, and the system was deaerated with nitrogen while performing stirring at 60° C. for 3 hours. There were added 2.5 g of 1,1-bis(t-hexylperoxy)cyclohexane and 29 g of (3-mercaptopropyl)triethoxysilane. The reaction was performed at 105° C. for 8 hours. Thus, a modified liquid diene polymer (B-3) was obtained which was a linear triblock copolymer composed of a butadiene homopolymer block, an isoprene homopolymer block and a butadiene homopolymer block and was modified with a functional group derived from the silane compound (1). In this block copolymer, the butadiene homopolymer blocks had been preferentially modified with a functional group derived from the silane compound (1) due to their higher reactivity with the silane compound (1).

Separately from the production of the polymer (B-3) in the autoclave described above, another 1 L volume autoclave was loaded with 177 g of the unmodified liquid diene polymer (B'-2), and the system was deaerated with nitrogen while performing stirring at 60° C. for 3 hours. There were added 3.4 g of t-butyl peroxypivalate and 56 g of (3-mercaptopropyl)triethoxysilane. The reaction was performed at 72° C. for 8 hours. Thus, a modified liquid diene polymer (B-13) was obtained which was a linear triblock copolymer composed of a butadiene homopolymer block, an isoprene homopolymer block and a butadiene homopolymer block and was modified with a functional group derived from the silane compound (1). The polymer (B-13) was washed with methanol to remove (3-mercaptopropyl)triethoxysilane that had not been radically added thereto, and was analyzed by $^1$H-NMR, and the average number of the functional groups per molecule was determined to be 15. In this block copolymer, the butadiene homopolymer blocks had been preferentially modified with a functional group derived from the silane compound (1) due to their higher reactivity with the silane compound (1).

Production Example 3: Production of Modified Liquid Diene Polymer (B-4)

A thoroughly dried 5 L autoclave was purged with nitrogen and was loaded with 1850 g of cyclohexane and 69 g of s-butyllithium (1.1 mol/L cyclohexane solution). After the temperature had been increased to 50° C., 823 g of butadiene was added first, thereafter 3.4 g of N,N,N',N'-tetramethylethylenediamine was added, and 550 g of butadiene was subsequently added. The monomers were sequentially polymerized while performing stirring and while controlling the polymerization temperature at 50° C. The polymerization reaction was terminated by the addition of methanol. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. The polymer solution after the washing operation was dried at 140° C. for 3 hours. Thus, an unmodified liquid diene polymer (B'-3) was obtained which was a linear diblock copolymer composed of a low-vinyl butadiene homopolymer block and a high-vinyl butadiene homopolymer block.

Subsequently, a 1 L volume autoclave was loaded with 378 g of the unmodified liquid diene polymer (B'-3) obtained above, and the system was deaerated with nitrogen while performing stirring at 60° C. for 3 hours. There were added 0.2 g of 1,1-bis(t-hexylperoxy)cyclohexane and 27 g of (3-mercaptopropyl)triethoxysilane. The reaction was performed at 105° C. for 8 hours. Thus, a modified liquid diene polymer (B-4) was obtained which was a linear diblock copolymer composed of a high-vinyl butadiene homopolymer block and a low-vinyl butadiene homopolymer block and was modified with a functional group derived from the silane compound (1). In this block copolymer, the high-vinyl butadiene homopolymer block had been preferentially modified with a functional group derived from the silane compound (1) due to its higher reactivity with the silane compound (1).

Production Example 4: Production of Modified Liquid Diene Polymer (B-5)

A thoroughly dried 1 L autoclave was purged with nitrogen and was loaded with 65 g of cyclohexane, 76 g of s-butyllithium (1.1 mol/L cyclohexane solution) and 13 g of triethylamine. The temperature was increased to 50° C. While performing stirring, 8.3 g of 1,3-bis(1-methylethenyl) benzene was added, and the mixture was stirred at 70° C. The resultant reaction liquid was cooled to 25° C., and 23 g of butadiene was added at once while performing stirring. The mixture was heated to 50° C. and stirred at the temperature for 30 minutes, and was thereafter cooled to 25° C.

A thoroughly dried 5 L autoclave was purged with nitrogen and was loaded with 2060 g of cyclohexane and the whole amount of the reaction solution obtained above. After the temperature had been increased to 50° C., 352 g of butadiene was added first, thereafter 3.4 g of N,N,N',N'-tetramethylethylenediamine was added, and 198 g of butadiene was subsequently added. The monomers were sequentially polymerized while performing stirring and while controlling the polymerization temperature at 50° C. The polymerization reaction was terminated by the addition of methanol. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. The polymer solution after the washing operation was dried at 140° C. for 3 hours. Thus, an unmodified liquid diene polymer (B'-4) was obtained which was a linear triblock copolymer composed of a high-vinyl butadiene homopolymer block, a low-vinyl butadiene homopolymer block and a high-vinyl butadiene homopolymer block.

Subsequently, a 1 L volume autoclave was loaded with 297 g of the unmodified liquid diene polymer (B'-4) obtained above, and the system was deaerated with nitrogen while performing stirring at 60° C. for 3 hours. There were added 0.1 g of 1,1-bis(t-hexylperoxy)cyclohexane and 21 g of (3-mercaptopropyl)triethoxysilane. The reaction was performed at 105° C. for 8 hours. Thus, a modified liquid diene polymer (B-5) was obtained which was a linear triblock copolymer composed of a high-vinyl butadiene homopolymer block, a low-vinyl butadiene homopolymer block and a high-vinyl butadiene homopolymer block and was modified with a functional group derived from the silane compound (1). In this block copolymer, the high-vinyl butadiene homopolymer blocks had been preferentially modified with a functional group derived from the silane compound (1) due to their higher reactivity with the silane compound (1).

Production Example 5: Production of Modified Liquid Diene Polymer (B-6)

A thoroughly dried 5 L autoclave was purged with nitrogen and was loaded with 1860 g of cyclohexane and 61 g of s-butyllithium (1.0 mol/L cyclohexane solution). After the temperature had been increased to 50° C., 5.8 g of tetrahydrofuran was added, and thereafter 1286 g of a butadiene isoprene mixture (which had been prepared beforehand by mixing 166 g of butadiene and 1120 g of isoprene in a tank) was subsequently added and polymerized while performing stirring and while controlling the polymerization temperature at 50° C. The polymerization reaction was terminated by the addition of methanol. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. The polymer solution after the washing operation was dried at 140° C. for 3 hours. Thus, an unmodified liquid diene polymer (B'-5) was obtained which was an isoprene/butadiene random copolymer.

Subsequently, a 1 L volume autoclave was loaded with 505 g of the unmodified liquid diene polymer (B'-5) obtained above, and the system was deaerated with nitrogen while performing stirring at 60° C. for 3 hours. There were added 3.7 g of 1,1-bis(t-hexylperoxy)cyclohexane and 30 g of (3-mercaptopropyl)triethoxysilane. The reaction was performed at 105° C. for 8 hours. Thus, a modified liquid diene polymer (B-6) was obtained which was an isoprene/butadiene random copolymer.

Production Example 6: Production of Modified Liquid Diene Polymer (B-7)

A thoroughly dried 5 L autoclave was purged with nitrogen and was loaded with 1850 g of cyclohexane and 69 g of s-butyllithium (1.1 mol/L cyclohexane solution). After the temperature had been increased to 50° C., 3.8 g of tetrahydrofuran was added, and thereafter 1363 g of butadiene was subsequently added and polymerized while performing stirring and while controlling the polymerization temperature at 50° C. The polymerization reaction was terminated by the addition of methanol. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. The polymer solution after the washing operation was dried at 140° C. for 3 hours. Thus, an unmodified liquid diene polymer (B'-6) was obtained which was a butadiene homopolymer.

Subsequently, a 1 L volume autoclave was loaded with 409 g of the unmodified liquid diene polymer (B'-6) obtained above, and the system was deaerated with nitrogen while performing stirring at 60° C. for 3 hours. There were added 0.2 g of 1,1-bis(t-hexylperoxy)cyclohexane and 27 g of (3-mercaptopropyl)triethoxysilane. The reaction was performed at 105° C. for 8 hours. Thus, a modified liquid diene polymer (B-7) was obtained.

Production Example 7: Production of Modified Liquid Diene Polymer (B-8)

A thoroughly dried 5 L autoclave was purged with nitrogen and was loaded with 1570 g of cyclohexane and 347 g of s-butyllithium (0.99 mol/L cyclohexane solution). After the temperature had been increased to 50° C., 797 g of butadiene was added first, thereafter 10.8 g of N,N,N',N'-tetramethylethylenediamine was added, and 522 g of butadiene was subsequently added. The monomers were sequentially polymerized while performing stirring and while controlling the polymerization temperature at 50° C. The polymerization reaction was terminated by the addition of methanol. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. The polymer solution after the washing operation was dried at 140° C. for 3 hours. Thus, an unmodified liquid diene polymer (B'-7) was obtained which was a linear diblock copolymer composed of a low-vinyl butadiene homopolymer block and a high-vinyl butadiene homopolymer block.

Subsequently, a 1 L volume autoclave was loaded with 444 g of the unmodified liquid diene polymer (B'-7) obtained above, and the system was deaerated with nitrogen while performing stirring at 60° C. for 3 hours. There were added 0.4 g of 1,1-bis(t-hexylperoxy)cyclohexane and 51 g of (3-mercaptopropyl)triethoxysilane. The reaction was performed at 105° C. for 8 hours. Thus, a modified liquid diene polymer (B-8) was obtained which was a linear diblock copolymer composed of a low-vinyl butadiene homopolymer block and a high-vinyl butadiene homopolymer block and was modified with a functional group derived from the silane compound (1). In this block copolymer, the high-vinyl butadiene homopolymer block had been preferentially modified with a functional group derived from the silane compound (1) due to its higher reactivity with the silane compound (1).

Production Example 8: Production of Modified Liquid Diene Polymer (B-9)

A thoroughly dried 5 L autoclave was purged with nitrogen and was loaded with 1660 g of cyclohexane and 262 g of s-butyllithium (1.2 mol/L cyclohexane solution). After the temperature had been increased to 50° C., 964 g of isoprene was added first, thereafter 14.7 g of N,N,N',N'-tetramethylethylenediamine was added, and 275 g of butadiene was subsequently added. The monomers were sequentially polymerized while performing stirring and while controlling the polymerization temperature at 50° C. The polymerization reaction was terminated by the addition of methanol. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. The polymer solution after the washing operation was dried at 140° C. for 3 hours. Thus, an unmodified liquid diene polymer (B'-8) was obtained which was a linear diblock copolymer composed of an isoprene homopolymer block and a butadiene homopolymer block.

Subsequently, a 1 L volume autoclave was loaded with 375 g of the unmodified liquid diene polymer (B'-8) obtained above, and the system was deaerated with nitrogen while performing stirring at 60° C. for 3 hours. There were added 4.6 g of 1,1-bis(t-hexylperoxy)cyclohexane and 43 g of (3-mercaptopropyl)triethoxysilane. The reaction was performed at 105° C. for 8 hours. Thus, a modified liquid diene polymer (B-9) was obtained which was a linear diblock copolymer composed of an isoprene homopolymer block and a butadiene homopolymer block and was modified with a functional group derived from the silane compound (1). In this block copolymer, the butadiene homopolymer block had been preferentially modified with a functional group derived from the silane compound (1) due to its higher reactivity with the silane compound (1).

Production Example 9: Production of Modified Liquid Diene Polymer (B-10)

A thoroughly dried 5 L autoclave was purged with nitrogen and was loaded with 1580 g of cyclohexane and 336 g of s-butyllithium (0.99 mol/L cyclohexane solution). After the temperature had been increased to 50° C., 23.4 g of tetrahydrofuran was added, and thereafter 218 g of butadiene, 776 g of isoprene and 234 g of butadiene were sequentially added and polymerized while performing stirring and while controlling the polymerization temperature at 50° C. The polymerization reaction was terminated by the addition of methanol. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. The polymer solution after the washing operation was dried at 140° C. for 3 hours. Thus, an unmodified liquid diene polymer (B'-9) was obtained which was a linear triblock copolymer composed of a butadiene homopolymer block, an isoprene homopolymer block and a butadiene homopolymer block.

Subsequently, a 1 L volume autoclave was loaded with 481 g of the unmodified liquid diene polymer (B'-9) obtained above, and the system was deaerated with nitrogen while performing stirring at 60° C. for 3 hours. There were added 4.9 g of 1,1-bis(t-hexylperoxy)cyclohexane and 79 g of (3-mercaptopropyl)triethoxysilane. The reaction was performed at 105° C. for 8 hours. Thus, a modified liquid diene polymer (B-10) was obtained which was a linear triblock copolymer composed of a butadiene homopolymer block, an isoprene homopolymer block and a butadiene homopolymer block and was modified with a functional group derived from the silane compound (1). In this block copolymer, the butadiene homopolymer blocks had been preferentially modified with a functional group derived from the silane compound (1) due to their higher reactivity with the silane compound (1).

Production Example 10: Production of Modified Liquid Diene Polymer (B-11)

A thoroughly dried 5 L autoclave was purged with nitrogen and was loaded with 1570 g of cyclohexane and 336 g of s-butyllithium (0.99 mol/L cyclohexane solution). After the temperature had been increased to 50° C., 11.3 g of tetrahydrofuran was added, and thereafter 205 g of butadiene, 732 g of isoprene and 275 g of butadiene were sequentially added and polymerized while performing stirring and while controlling the polymerization temperature at 50° C. The polymerization reaction was terminated by the addition of methanol. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. The polymer solution after the washing operation was dried at 140° C. for 3 hours. Thus, an unmodified liquid diene polymer (B'-10) was obtained which was a linear triblock copolymer composed of a butadiene homopolymer block, an isoprene homopolymer block and a butadiene homopolymer block.

Subsequently, a 1 L volume autoclave was loaded with 339 g of the unmodified liquid diene polymer (B'-10) obtained above, and the system was deaerated with nitrogen while performing stirring at 60° C. for 3 hours. There were added 4.3 g of 1,1-bis(t-hexylperoxy)cyclohexane and 56 g of (3-mercaptopropyl)triethoxysilane. The reaction was performed at 105° C. for 8 hours. Thus, a modified liquid diene polymer (B-11) was obtained which was a linear triblock copolymer composed of a butadiene homopolymer block, an isoprene homopolymer block and a butadiene homopolymer block and was modified with a functional group derived from the silane compound (1). In this block copolymer, the butadiene homopolymer blocks had been preferentially modified with a functional group derived from the silane compound (1) due to their higher reactivity with the silane compound (1).

Production Example 11: Production of Modified Liquid Diene Rubber (B-12)

A thoroughly dried 5 L autoclave was purged with nitrogen and was loaded with 1150 g of hexane and 154 g of n-butyllithium (17 mass % hexane solution). After the temperature had been increased to 50° C., 10 g of N,N,N',N'-tetramethylethylenediamine was added, and thereafter 1250 g of butadiene was subsequently added and polymerized while performing stirring and while controlling the polymerization temperature at 50° C. The polymerization reaction was terminated by the addition of methanol. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. The polymer solution after the washing operation was vacuum dried at 70° C. for 24 hours. Thus, an unmodified liquid diene polymer (B'-11) was obtained which was a butadiene homopolymer.

Subsequently, a 1 L volume autoclave was loaded with 700 g of the unmodified liquid diene rubber (B'-11) obtained above, and the system was deaerated with nitrogen while performing stirring at 60° C. for 3 hours. There were added 0.2 g of 1,1-bis(t-hexylperoxy)cyclohexane and 130 g of (3-mercaptopropyl)triethoxysilane. The reaction was performed at 105° C. for 8 hours. Thus, a modified liquid diene polymer (B-12) was obtained.

Properties of the materials such as the modified liquid diene polymers obtained in Production Examples were measured and calculated by the following methods.

(Method for Measuring Weight Average Molecular Weight)

The Mw of the modified liquid diene polymers (B) was measured by GPC (gel permeation chromatography) relative to standard polystyrenes. The measurement involved the following apparatus and conditions.

- Apparatus: GPC apparatus "HLC-8320 GPC" manufactured by TOSOH CORPORATION
- Separation columns: "TSKgel Super HZ4000×2" manufactured by TOSOH CORPORATION
- Eluent: Tetrahydrofuran
- Eluent flow rate: 0.35 mL/min
- Sample concentration: 5 mg/10 mL
- Column temperature: 40° C.

(Vinyl Contents)

The vinyl contents in the modified liquid diene polymer (B), the polymer block (b'1) or (b"1), and the polymer block (b'2) or (b"2) were measured with $^1$H-NMR (500 MHz) manufactured by JEOL Ltd. The concentration was sample/deuterated chloroform=50 mg/1 mL. The number of scans was 32. With respect to the spectrum obtained, the vinyl contents were calculated from the ratio of the area of the peaks assigned to 1,2-bonded and 3,4-bonded conjugated diene units, and the area of the peak assigned to 1,4-bonded conjugated diene units.

(Glass Transition Temperature)

A 10 mg portion of the modified liquid diene polymer (B) was placed into an aluminum pan and was analyzed by differential scanning calorimetry (DSC) at a heat-up rate of 10° C./min. With respect to the thermogram obtained, the peak top value of the DDSC curve was adopted as the glass transition temperature.

(Method for Measuring Melt Viscosity at 38° C.)

The melt viscosity of the modified liquid diene polymers (B) was measured at 38° C. with a Brookfield viscometer (manufactured by BROOKFIELD ENGINEERING LABS., INC.).

(Average Number of Functional Groups Per Molecule)

The average number of functional groups per molecule of the modified liquid diene polymer (B) may be calculated from the functional group equivalent weight (g/eq) and the styrene equivalent number average molecular weight Mn of the modified liquid diene polymer (B).

(Average number of functional groups per molecule)
=[(Number average molecular weight Mn)/(Molecular weight of styrene unit)×(Average molecular weight of units of conjugated dienes and optional monomers other than conjugated dienes)]/(Functional group equivalent weight)

The functional group equivalent weight of the modified liquid diene polymer (B) indicates the mass of conjugated dienes and optional monomers other than conjugated dienes that are bonded together per one functional group. The functional group equivalent weight may be calculated from the ratio of the area of the peak assigned to the polymer main chains to the area of the peak assigned to the functional groups using $^1$H-NMR or $^{13}$C-NMR. The peak assigned to the functional groups is a peak assigned to alkoxy groups.

(Proportion of Length of (b'1) or (b"1))

The proportion of the length of the polymer block (b'1) or (b"1) in the unmodified liquid diene block copolymer (B'1) or (B'2) may be determined from the entire chain length of the block copolymer and the length of the polymer block in the block copolymer. The lengths of the polymer blocks in the block copolymer may be obtained by determining the respective numbers of the monomer units contained in the block copolymer by $^1$H-NMR measurement and calculating the lengths assuming that the bond length of a carbon-carbon single bond in the main chain of the block copolymer is 150 pm, the bond length of a carbon-carbon double bond is 135 pm, and the bond angle is 120°. The entire chain length of the block copolymer may be obtained from the total of the numbers of the respective monomer units in the block copolymer determined as described above.

Table 1 below describes the properties of the modified liquid diene polymers (B-1) to (B-13) obtained in Production Examples 1 to 11. The block configurations of the unmodified liquid diene block copolymers (B'-1) to (B'-11) as the raw materials for the modified liquid diene polymers (B-1) to (B-13) are described in Table 2.

TABLE 1

| Modified liquid diene polymers (MLDP) | Weight average molecular weight (×10³) | Mw/Mn | Butadiene content (wt %) | Vinyl content (mol %) | Vinyl content (mol %) in (b'1) or (b"1) | Vinyl content (mol %) in (b'2) or (b"2) | Tg (° C.) | Melt viscosity (38° C.) (Pa·s) | Average number of functional groups per molecule (groups) | Proportion (%) of length of (b'1) or (b"1) |
|---|---|---|---|---|---|---|---|---|---|---|
| MLDP (B-1) | 39 | 1.23 | 16 | 35.0 | 37 | 34.6 | −45.7 | 151 | 4 | 17.8 |
| MLDP (B-2) | 35 | 1.17 | 16 | 35.0 | 37 | 34.6 | −46.5 | 166 | 3 | 17.8 |
| MLDP (B-3) | 43 | 1.25 | 15 | 35.6 | 39.5/37.5 | 34.6 | −45.0 | 161 | 4 | 18.4 |
| MLDP (B-4) | 38 | 1.22 | 100 | 28.2 | 63.7 | 8.4 | −74.3 | 166 | 4 | 28.9 |
| MLDP (B-5) | 43 | 1.45 | 100 | 31.2 | 56.5/56.5 | 18.3 | −73.0 | 630 | 4 | 29.5 |
| MLDP (B-6) | 32 | 1.13 | 11 | 36.0 | — | — | −43.2 | 187 | 3 | — |
| MLDP (B-7) | 48 | 1.47 | 100 | 30.7 | — | — | −74.3 | 243 | 4 | — |
| MLDP (B-8) | 6.5 | 1.07 | 100 | 28.3 | 59.9 | 11.8 | −78.4 | 1.49 | 2 | 24.4 |
| MLDP (B-9) | 6.4 | 1.16 | 22 | 14.7 | 38.7 | 7.8 | −62.5 | 2.06 | 2 | 14.9 |
| MLDP (B-10) | 6.1 | 1.17 | 37 | 44.2 | 42.6/30.7 | 49.2 | −47.5 | 5.18 | 2 | 41.1 |
| MLDP (B-11) | 6 | 1.14 | 41 | 29.1 | 29.4/29.8 | 28.7 | −62.9 | 1.66 | 2 | 41.0 |
| MLDP (B-12) | 6.1 | 1.06 | 100 | 53.6 | — | — | −46.1 | 5.55 | 2 | — |
| MLDP (B-13) | 54 | 1.47 | 15 | 35.6 | 39.5/37.5 | 34.6 | −45.0 | 161 | 15 | 18.4 |

TABLE 2

| Unmodified liquid diene block copolymers | Block configurations |
|---|---|
| Unmodified liquid diene block copolymer (B'-1) | Isoprene homopolymer block-butadiene homopolymer block |
| Unmodified liquid diene block copolymer (B'-2) | Butadiene homopolymer block-isoprene homopolymer block-butadiene homopolymer block |
| Unmodified liquid diene block copolymer (B'-3) | Low vinyl butadiene homopolymer block-high vinyl butadiene homopolymer block |
| Unmodified liquid diene block copolymer (B'-4) | High vinyl butadiene homopolymer block-low vinyl butadiene homopolymer block-high vinyl butadiene homopolymer block |

TABLE 2-continued

| Unmodified liquid diene block copolymers | Block configurations |
|---|---|
| Unmodified liquid diene block copolymer (B'-5) | Isoprene/butadiene random copolymer |
| Unmodified liquid diene block copolymer (B'-6) | Butadiene homopolymer |
| Unmodified liquid diene block copolymer (B'-7) | Low vinyl butadiene homopolymer block-high vinyl butadiene homopolymer block |
| Unmodified liquid diene block copolymer (B'-8) | Isoprene homopolymer block-butadiene homopolymer block |
| Unmodified liquid diene block copolymer (B'-9) | Butadiene homopolymer block-isoprene homopolymer block-butadiene homopolymer block |
| Unmodified liquid diene block copolymer (B'-10) | Butadiene homopolymer block-isoprene homopolymer block-butadiene homopolymer block |
| Unmodified liquid diene block copolymer (B'-11) | Butadiene homopolymer |

Examples 1 to 18 and Comparative Examples 1 to 5

The solid rubbers (A), the modified liquid diene polymer (B), the filler (C), TDAE, the silane coupling agent, zinc oxide, stearic acid, the wax and the antioxidant were added in the amounts (parts by mass) described in Tables 3 to 6 into an internal Banbury mixer and were kneaded together for 6 minutes from a start temperature of 60° C. to a resin temperature of 150° C. Thereafter, the kneaded mixture was removed from the mixer and was cooled to room temperature. Next, the mixture was placed into the Banbury mixer again, and the vulcanizing agent and the vulcanization accelerators were added. The resultant mixture was kneaded for 75 seconds from a start temperature of 50° C. to a maximum temperature of 100° C. Rubber compositions were thus obtained.

The rubber compositions obtained were subjected to press forming (160° C., 30 to 50 minutes) to give vulcanized rubber sheets (2 mm in thickness). The sheets were tested by the methods described below to evaluate the Payne effect, the Mooney viscosity, the rolling resistance performance, the abrasion resistance, the wet grip, the tensile break elongation and the tensile break strength. The results are described in Tables 3 to 6.

The measurement methods for the above evaluations will be described below.

(Payne Effect)

The sheets of the rubber compositions prepared in Examples and Comparative Examples were cut into test pieces 40 mm in length and 5 mm in width. The test pieces were tested on a dynamic viscoelastometer manufactured by GABO GmbH at a measurement temperature of 25° C. to measure the storage modulus E' (0.5%) at 0.5% strain and the storage modulus E' (5.0%) at 5.0% strain. The difference (in absolute value) between E' (0.5%) and E' (5.0%) was calculated. The data of Examples and Comparative Examples in Table 3 are values relative to the value of Comparative Example 2 taken as 100. The data of Examples and Comparative Example in Table 5 are values relative to the value of Comparative Example 5 taken as 100. The smaller the value, the lower the Payne effect and the higher the silica dispersibility in the rubber composition.

(Mooney Viscosity)

The Mooney viscosity $(ML_{1+4})$ of the rubber compositions before vulcanization was measured at 130° C. in accordance with JIS K 6300. The data of Examples and Comparative Examples in Table 3 are values relative to the value of Comparative Example 2 taken as 100. The data of Examples and Comparative Examples in Table 6 are values relative to the value of Comparative Example 4 taken as 100. The smaller the value, the more excellent the processability of the rubber composition.

(Rolling Resistance Performance)

The sheets of the rubber compositions prepared in Examples and Comparative Examples were cut to give test pieces 40 mm in length and 5 mm in width. The test pieces were tested on a dynamic viscoelastometer manufactured by GABO GmbH at a measurement temperature of 60° C., a frequency of 10 Hz, a static strain of 10% and a dynamic strain of 2% to determine tan δ as an indicator of rolling resistance performance. The data of Examples and Comparative Examples in Table 3 are values relative to the value of Comparative Example 2 taken as 100. The data of Examples and Comparative Example in Table 5 are values relative to the value of Comparative Example 5 taken as 100. The smaller the value, the more excellent the rolling resistance performance of the rubber composition.

(Abrasion Resistance, DIN Abrasion Tester)

The DIN abrasion loss was measured with a load of 10 N and an abrasion distance of 40 m in accordance with JIS K 6264. The data of Examples and Comparative Examples in Table 3 are values relative to the reciprocal of the DIN abrasion loss in Comparative Example 2 taken as 100. The data of Examples and Comparative Example in Table 5 are values relative to the reciprocal of the DIN abrasion loss in Comparative Example 5 taken as 100. The larger the value, the smaller the abrasion loss and the more excellent the abrasion resistance.

(Abrasion Resistance, FPS Abrasion Tester)

The rubber compositions prepared in Examples and Comparative Examples were formed into test pieces 50 mm in diameter and 10 mm in thickness which had a hole of the size of a core bar of an FPS abrasion tester manufactured by Ueshima Seisakusho Co., Ltd. METABRIT (granularity: 240, abrasive grains A) manufactured by Noritake Coated Abrasive Co., Ltd. was used as the abrasive road surface. The FPS abrasion loss was measured at a sample speed of 80 m/min, a load of 40 N, a talc feeder of 0.4 rpm, a preset temperature of 35° C., and a slip ratio of 3%. The data of Examples and Comparative Examples in Table 4 are values relative to the reciprocal of the FPS abrasion loss in Comparative Example 4 taken as 100. The larger the value, the smaller the abrasion loss and the more excellent the abrasion resistance.

(Wet Grip)

The sheets of the rubber compositions prepared in Examples and Comparative Examples were cut to give test pieces 40 mm in length and 5 mm in width. The test pieces were tested on a dynamic viscoelastometer manufactured by GABO GmbH at a measurement temperature of 0° C., a frequency of 10 Hz, a static strain of 10% and a dynamic strain of 2% to determine tan δ as an indicator of wet grip. The data of Examples and Comparative Examples in Tables 4 and 6 are values relative to the value of Comparative Example 4 taken as 100. The larger the value, the more excellent the wet grip of the rubber composition.

(Tensile Break Elongation)

The rubber compositions prepared in Examples and Comparative Examples were press-formed into vulcanized rubber sheets, which were then punched to give JIS dumbbell-shaped No. 3 test pieces. The tensile break elongation was measured with an Instron tensile tester in accordance with JIS K 6251. The data of Examples and Comparative Example in Table 5 are values relative to the value of Comparative Example 5 taken as 100. The larger the value, the more excellent the break characteristics.

(Tensile Break Strength)

The rubber compositions prepared in Examples and Comparative Examples were press-formed into vulcanized rubber sheets, which were then punched to give JIS dumbbell-shaped No. 3 test pieces. The tensile break strength was measured with an Instron tensile tester in accordance with JIS K 6251. The data of Examples and Comparative Example in Table 5 are values relative to the value of Comparative Example 5 taken as 100. The larger the value, the more excellent the break characteristics.

TABLE 3

| | | | Examples | | | | | | |
|---|---|---|---|---|---|---|---|---|---|
| | | | 1 | 2 | 3 | 4 | 5 | 6 | 7 |
| Amounts (parts by mass) | Components (A) | Solution polymerized styrene butadiene rubber | 80 | 80 | 80 | 80 | 80 | 80 | 80 |
| | | Butadiene rubber | 20 | 20 | 20 | 20 | 20 | 20 | 20 |
| | Components (B) | Modified liquid diene polymer (B-1) | 6 | 12 | | | | | |
| | | Modified liquid diene polymer (B-2) | | | 6 | 12 | | | |
| | | Modified liquid diene polymer (B-3) | | | | | 6 | 12 | |
| | | Modified liquid diene polymer (B-4) | | | | | | | 6 |
| | | Modified liquid diene polymer (B-5) | | | | | | | |
| | | Modified liquid diene polymer (B-13) | | | | | | | |
| | Component (C) | Silica | 100 | 100 | 100 | 100 | 100 | 100 | 100 |
| | Optional components | TDAE | 28 | 28 | 28 | 28 | 28 | 28 | 28 |
| | | Silane coupling agent (1) | 8 | 8 | 8 | 8 | 8 | 8 | 8 |
| | | Zinc oxide | 3 | 3 | 3 | 3 | 3 | 3 | 3 |
| | | Stearic acid | 2.5 | 2.5 | 2.5 | 2.5 | 2.5 | 2.5 | 2.5 |
| | | Wax | 2 | 2 | 2 | 2 | 2 | 2 | 2 |
| | | Antioxidant (1) | 2.5 | 2.5 | 2.5 | 2.5 | 2.5 | 2.5 | 2.5 |
| | | Sulfur | 1.5 | 1.5 | 1.5 | 1.5 | 1.5 | 1.5 | 1.5 |
| | | Vulcanization accelerator (1) | 0.35 | 0.35 | 0.35 | 0.35 | 0.35 | 0.35 | 0.35 |
| | | Vulcanization accelerator (2) | 0.5 | 0.5 | 0.5 | 0.5 | 0.5 | 0.5 | 0.5 |
| | | Vulcanization accelerator (3) | 1.5 | 1.5 | 1.5 | 1.5 | 1.5 | 1.5 | 1.5 |
| Properties | Payne effect (0.5% E' − 5% E', relative value) | | 86 | 63 | 83 | 61 | 82 | 56 | 85 |
| | Mooney viscosity (relative value) | | 91 | 85 | 91 | 82 | 94 | 88 | 89 |
| | Rolling resistance performance (tanδ at 60° C., relative value) | | 98 | 94 | 99 | 97 | 95 | 89 | 99 |
| | Abrasion resistance (DIN abrasion test, relative value) | | 108 | 114 | 106 | 111 | 106 | 113 | 92 |

| | | | Examples | | | | Comparative Examples | |
|---|---|---|---|---|---|---|---|---|
| | | | 8 | 9 | 10 | 11 | 1 | 2 |
| Amounts (parts by mass) | Components (A) | Solution polymerized styrene butadiene rubber | 80 | 80 | 80 | 80 | 80 | 80 |
| | | Butadiene rubber | 20 | 20 | 20 | 20 | 20 | 20 |
| | Components (B) | Modified liquid diene polymer (B-1) | | | | | | |
| | | Modified liquid diene polymer (B-2) | | | | | | |
| | | Modified liquid diene polymer (B-3) | | | | | | |
| | | Modified liquid diene polymer (B-4) | 12 | | | | | |
| | | Modified liquid diene polymer (B-5) | | 6 | 12 | | | |
| | | Modified liquid diene polymer (B-13) | | | | 12 | | |
| | Component (C) | Silica | 100 | 100 | 100 | 100 | 100 | 100 |
| | Optional components | TDAE | 28 | 28 | 28 | 28 | 34 | 28 |
| | | Silane coupling agent (1) | 8 | 8 | 8 | 8 | 8 | 8 |
| | | Zinc oxide | 3 | 3 | 3 | 3 | 3 | 3 |
| | | Stearic acid | 2.5 | 2.5 | 2.5 | 2.5 | 2.5 | 2.5 |
| | | Wax | 2 | 2 | 2 | 2 | 2 | 2 |
| | | Antioxidant (1) | 2.5 | 2.5 | 2.5 | 2.5 | 2.5 | 2.5 |
| | | Sulfur | 1.5 | 1.5 | 1.5 | 1.5 | 1.5 | 1.5 |
| | | Vulcanization accelerator (1) | 0.35 | 0.35 | 0.35 | 0.35 | 0.35 | 0.35 |
| | | Vulcanization accelerator (2) | 0.5 | 0.5 | 0.5 | 0.5 | 0.5 | 0.5 |
| | | Vulcanization accelerator (3) | 1.5 | 1.5 | 1.5 | 1.5 | 1.5 | 1.5 |
| Properties | Payne effect (0.5% E' − 5% E', relative value) | | 59 | 78 | 53 | 63 | 83 | 100 |
| | Mooney viscosity (relative value) | | 82 | 94 | 87 | 90 | 88 | 100 |
| | Rolling resistance performance (tanδ at 60° C., relative value) | | 94 | 96 | 90 | 84 | 96 | 100 |
| | Abrasion resistance (DIN abrasion test, relative value) | | 119 | 116 | 124 | 113 | 91 | 100 |

TABLE 4

|  |  |  | Examples | | | | | |
| --- | --- | --- | --- | --- | --- | --- | --- | --- |
|  |  |  | 1 | 2 | 4 | 5 | 6 | 7 |
| Amounts (parts by mass) | Components (A) | Solution polymerized styrene butadiene rubber | 80 | 80 | 80 | 80 | 80 | 80 |
|  |  | Butadiene rubber | 20 | 20 | 20 | 20 | 20 | 20 |
|  | Components (B) | Modified liquid diene polymer (B-1) | 6 | 12 |  |  |  |  |
|  |  | Modified liquid diene polymer (B-2) |  |  | 12 |  |  |  |
|  |  | Modified liquid diene polymer (B-3) |  |  |  | 6 | 12 |  |
|  |  | Modified liquid diene polymer (B-4) |  |  |  |  |  | 6 |
|  |  | Modified liquid diene polymer (B-5) |  |  |  |  |  |  |
|  |  | Modified liquid diene polymer (B-6) |  |  |  |  |  |  |
|  |  | Modified liquid diene polymer (B-7) |  |  |  |  |  |  |
|  |  | Modified liquid diene polymer (B-13) |  |  |  |  |  |  |
|  | Component (C) | Silica | 100 | 100 | 100 | 100 | 100 | 100 |
|  | Optional components | TDAE | 28 | 28 | 28 | 28 | 28 | 28 |
|  |  | Silane coupling agent (1) | 8 | 8 | 8 | 8 | 8 | 8 |
|  |  | Zinc oxide | 3 | 3 | 3 | 3 | 3 | 3 |
|  |  | Stearic acid | 2.5 | 2.5 | 2.5 | 2.5 | 2.5 | 2.5 |
|  |  | Wax | 2 | 2 | 2 | 2 | 2 | 2 |
|  |  | Antioxidant (1) | 2.5 | 2.5 | 2.5 | 2.5 | 2.5 | 2.5 |
|  |  | Sulfur | 1.5 | 1.5 | 1.5 | 1.5 | 1.5 | 1.5 |
|  |  | Vulcanization accelerator (1) | 0.35 | 0.35 | 0.35 | 0.35 | 0.35 | 0.35 |
|  |  | Vulcanization accelerator (2) | 0.5 | 0.5 | 0.5 | 0.5 | 0.5 | 0.5 |
|  |  | Vulcanization accelerator (3) | 1.5 | 1.5 | 1.5 | 1.5 | 1.5 | 1.5 |
| Properties | | Abrasion resistance (FPS abrasion test, relative value) | 152 | 124 | 115 | 133 | 110 | 139 |
|  | | Wet grip performance (tanδ at 0° C., relative value) | 130 | 122 | 120 | 131 | 124 | 124 |

|  |  |  | Examples | | | | Comparative Examples | |
| --- | --- | --- | --- | --- | --- | --- | --- | --- |
|  |  |  | 8 | 9 | 10 | 11 | 3 | 4 |
| Amounts (parts by mass) | Components (A) | Solution polymerized styrene butadiene rubber | 80 | 80 | 80 | 80 | 80 | 80 |
|  |  | Butadiene rubber | 20 | 20 | 20 | 20 | 20 | 20 |
|  | Components (B) | Modified liquid diene polymer (B-1) |  |  |  |  |  |  |
|  |  | Modified liquid diene polymer (B-2) |  |  |  |  |  |  |
|  |  | Modified liquid diene polymer (B-3) |  |  |  |  |  |  |
|  |  | Modified liquid diene polymer (B-4) | 12 |  |  |  |  |  |
|  |  | Modified liquid diene polymer (B-5) |  | 6 | 12 |  |  |  |
|  |  | Modified liquid diene polymer (B-6) |  |  |  |  | 12 |  |
|  |  | Modified liquid diene polymer (B-7) |  |  |  |  |  | 12 |
|  |  | Modified liquid diene polymer (B-13) |  |  |  | 12 |  |  |
|  | Component (C) | Silica | 100 | 100 | 100 | 100 | 100 | 100 |
|  | Optional components | TDAE | 28 | 28 | 28 | 28 | 28 | 28 |
|  |  | Silane coupling agent (1) | 8 | 8 | 8 | 8 | 8 | 8 |
|  |  | Zinc oxide | 3 | 3 | 3 | 3 | 3 | 3 |
|  |  | Stearic acid | 2.5 | 2.5 | 2.5 | 2.5 | 2.5 | 2.5 |
|  |  | Wax | 2 | 2 | 2 | 2 | 2 | 2 |
|  |  | Antioxidant (1) | 2.5 | 2.5 | 2.5 | 2.5 | 2.5 | 2.5 |
|  |  | Sulfur | 1.5 | 1.5 | 1.5 | 1.5 | 1.5 | 1.5 |
|  |  | Vulcanization accelerator (1) | 0.35 | 0.35 | 0.35 | 0.35 | 0.35 | 0.35 |
|  |  | Vulcanization accelerator (2) | 0.5 | 0.5 | 0.5 | 0.5 | 0.5 | 0.5 |
|  |  | Vulcanization accelerator (3) | 1.5 | 1.5 | 1.5 | 1.5 | 1.5 | 1.5 |
| Properties | | Abrasion resistance (FPS abrasion test, relative value) | 116 | 131 | 108 | 92 | 112 | 100 |
|  | | Wet grip performance (tanδ at 0° C., relative value) | 110 | 122 | 107 | 128 | 119 | 100 |

From the results described in Tables 3 and 4, it has been shown that Examples 1 to 11 which involved the modified liquid diene polymers of the present invention achieved improvements in silica dispersibility, processability, rolling resistance performance, abrasion resistance and wet grip performance. The modified liquid diene polymers (B-4) and (B-5) were obtained by modifying a butadiene polymer having blocks with different vinyl contents. As described in Table 4, Examples 7 to 10 which involved these modified liquid diene polymers of the present invention attained improvements in abrasion resistance and wet grip performance compared to Comparative Example 4 which used the modified liquid diene polymer (B-7) obtained by the modification of a butadiene homopolymer with a uniform vinyl content.

TABLE 5

| | | | Examples | | | | | | | Comparative Example |
| --- | --- | --- | --- | --- | --- | --- | --- | --- | --- | --- |
| | | | 12 | 13 | 14 | 15 | 16 | 17 | 18 | 5 |
| Amounts (parts by mass) | Components (A) | Solution polymerized styrene butadiene rubber | 80 | 80 | 80 | 80 | 80 | 80 | 80 | 80 |
| | | Butadiene rubber | 20 | 20 | 20 | 20 | 20 | 20 | 20 | 20 |
| | Components (B) | Modified liquid diene polymer (B-8) | 6 | 12 | | | | | | |
| | | Modified liquid diene polymer (B-9) | | | 6 | 12 | | | | |
| | | Modified liquid diene polymer (B-10) | | | | | 6 | 12 | | |
| | | Modified liquid diene polymer (B-11) | | | | | | | 12 | |
| | | Modified liquid diene polymer (B-12) | | | | | | | | 12 |
| | Component (C) | Silica | 100 | 100 | 100 | 100 | 100 | 100 | 100 | 100 |
| | Optional components | TDAE | 28 | 28 | 28 | 28 | 28 | 28 | 28 | 28 |
| | | Silane coupling agent (1) | 8 | 8 | 8 | 8 | 8 | 8 | 8 | 8 |
| | | Zinc oxide | 3 | 3 | 3 | 3 | 3 | 3 | 3 | 3 |
| | | Stearic acid | 2.5 | 2.5 | 2.5 | 2.5 | 2.5 | 2.5 | 2.5 | 2.5 |
| | | Wax | 2 | 2 | 2 | 2 | 2 | 2 | 2 | 2 |
| | | Antioxidant (1) | 2.5 | 2.5 | 2.5 | 2.5 | 2.5 | 2.5 | 2.5 | 2.5 |
| | | Sulfur | 1.5 | 1.5 | 1.5 | 1.5 | 1.5 | 1.5 | 1.5 | 1.5 |
| | | Vulcanization accelerator (1) | 0.35 | 0.35 | 0.35 | 0.35 | 0.35 | 0.35 | 0.35 | 0.35 |
| | | Vulcanization accelerator (2) | 0.5 | 0.5 | 0.5 | 0.5 | 0.5 | 0.5 | 0.5 | 0.5 |
| | | Vulcanization accelerator (3) | 1.5 | 1.5 | 1.5 | 1.5 | 1.5 | 1.5 | 1.5 | 1.5 |
| Properties | Payne effect (0.5% E' − 5% E', relative value) | | 81 | 64 | 79 | 56 | 75 | 87 | 69 | 100 |
| | Rolling resistance performance (tanδ at 60° C., relative value) | | 97 | 96 | 100 | 98 | 97 | 96 | 97 | 100 |
| | Abrasion resistance (DIN abrasion test, relative value) | | 112 | 109 | 110 | 114 | 114 | 109 | 105 | 100 |
| | Tensile break elongation (relative value) | | 98 | 109 | 104 | 114 | 94 | 107 | 98 | 100 |
| | Tensile break strength (relative value) | | 103 | 101 | 105 | 106 | 103 | 110 | 99 | 100 |

From the results described in Table 5, it has been shown that Examples 12 to 18 which involved the modified liquid diene polymers of the present invention attained good silica dispersibility, rolling resistance performance, abrasion resistance and break characteristics.

TABLE 6

| | | | Examples | | | | | | | Comparative Examples | |
| --- | --- | --- | --- | --- | --- | --- | --- | --- | --- | --- | --- |
| | | | 12 | 13 | 14 | 15 | 16 | 17 | 18 | 3 | 4 |
| Amounts (parts by mass) | Components (A) | Solution polymerized styrene butadiene rubber | 80 | 80 | 80 | 80 | 80 | 80 | 80 | 80 | 80 |
| | | Butadiene rubber | 20 | 20 | 20 | 20 | 20 | 20 | 20 | 20 | 20 |
| | Components (B) | Modified liquid diene polymer (B-6) | | | | | | | | 12 | |
| | | Modified liquid diene polymer (B-7) | | | | | | | | | 12 |
| | | Modified liquid diene polymer (B-8) | 6 | 12 | | | | | | | |
| | | Modified liquid diene polymer (B-9) | | | 6 | 12 | | | | | |
| | | Modified liquid diene polymer (B-10) | | | | | 6 | 12 | | | |
| | | Modified liquid diene polymer (B-11) | | | | | | | 12 | | |
| | Component (C) | Silica | 100 | 100 | 100 | 100 | 100 | 100 | 100 | 100 | 100 |
| | Optional components | TDAE | 28 | 28 | 28 | 28 | 28 | 28 | 28 | 28 | 28 |
| | | Silane coupling agent (1) | 8 | 8 | 8 | 8 | 8 | 8 | 8 | 8 | 8 |
| | | Zinc oxide | 3 | 3 | 3 | 3 | 3 | 3 | 3 | 3 | 3 |
| | | Stearic acid | 2.5 | 2.5 | 2.5 | 2.5 | 2.5 | 2.5 | 2.5 | 2.5 | 2.5 |
| | | Wax | 2 | 2 | 2 | 2 | 2 | 2 | 2 | 2 | 2 |
| | | Antioxidant (1) | 2.5 | 2.5 | 2.5 | 2.5 | 2.5 | 2.5 | 2.5 | 2.5 | 2.5 |
| | | Sulfur | 1.5 | 1.5 | 1.5 | 1.5 | 1.5 | 1.5 | 1.5 | 1.5 | 1.5 |
| | | Vulcanization accelerator (1) | 0.35 | 0.35 | 0.35 | 0.35 | 0.35 | 0.35 | 0.35 | 0.35 | 0.35 |
| | | Vulcanization accelerator (2) | 0.5 | 0.5 | 0.5 | 0.5 | 0.5 | 0.5 | 0.5 | 0.5 | 0.5 |
| | | Vulcanization accelerator (3) | 1.5 | 1.5 | 1.5 | 1.5 | 1.5 | 1.5 | 1.5 | 1.5 | 1.5 |
| Properties | Mooney viscosity (relative value) | | 99 | 86 | 102 | 90 | 102 | 91 | 93 | 100 | 100 |
| | Wet grip performance (tanδ at 0° C., relative value) | | 129 | 120 | 133 | 125 | 139 | 138 | 129 | 119 | 100 |

From the results described in Table 6, it has been shown that Examples 12 to 18 which involved the modified liquid diene polymers of the present invention attained excellent wet grip performance compared to Comparative Examples 3 and 4. Further, Examples 13, 15, 17 and 18 resulted in a low Mooney viscosity and attained excellent processability compared with Comparative Examples 3 and 4 which involved the same amount of the modified liquid diene polymer.

INDUSTRIAL APPLICABILITY

The rubber compositions of the present invention have excellent processability and filler dispersibility. Further, when rendered crosslinkable by the addition of a crosslinking agent or the like, the rubber compositions give superior crosslinked products which contain the filler dispersed in the crosslinked products in a state that is ideal for properties enhancements (for example, in such a state that the Payne effect can be reduced) and which thereby attain enhancements in properties such as abrasion resistance. Thus, the compositions of the present invention may be suitably used in applications such as industrial parts including tires, industrial belts and industrial rubber hoses. In particular, the crosslinked products are useful as tires or the like because enhanced performances such as wet grip performance and abrasion resistance are obtained.

The invention claimed is:

1. A modified liquid diene polymer (B1) comprising a product of modification, with a silane compound represented by the formula (1) below, of a liquid diene block copolymer (B'1) including a polymer block (b'1) containing butadiene units and a polymer block (b'2), the modified liquid diene polymer (B1) having a functional group derived from the silane compound represented by the formula (1) introduced at a polymer side chain, the modified liquid diene polymer (B1) satisfying the following (i) to (iv):
   (i) the weight average molecular weight (Mw) of the modified liquid diene polymer (B1) is 6,000 to 120,000,
   (ii) the vinyl content in the butadiene units in the polymer block (b'1) is 40 to 100 mol %,
   (iii) the polymer block (b'2) contains butadiene units having a vinyl content of 0 to 25 mol %, and
   (iv) the average number of the functional groups per molecule of the modified liquid diene polymer (B1) is 1 to 20,

[Chem. 1]

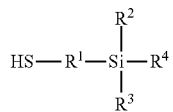

(1)

wherein $R^1$ is a $C_{1-6}$ divalent alkylene group, and $R^2$, $R^3$ and $R^4$ are each independently a methoxy group, an ethoxy group, a phenoxy group, a methyl group, an ethyl group or a phenyl group, with the proviso that at least one of $R^2$, $R^3$ and $R^4$ is a methoxy group, an ethoxy group or a phenoxy group, wherein the modified liquid diene polymer (B1) is a linear polymer, the polymer block (b'1) is present at one end or both ends of the liquid diene block copolymer (B'1), and the total length of the polymer block(s) (b'1) is not more than 45% of all the chain length of the liquid diene block copolymer (B'1).

2. The modified liquid diene polymer (B1) according to claim 1, wherein the modified liquid diene polymer (B1) is a linear polymer, and not less than 65% of the functional groups derived from the silane compound are present in a region or regions extending from one end or both ends to 45% in total of all the chain length of the modified liquid diene polymer (B1).

3. The modified liquid diene polymer (B1) according to claim 1, wherein the melt viscosity at 38° C. is 0.1 to 4,000 Pa·s.

4. The modified liquid diene polymer (B1) according to claim 1, wherein the average number of functional groups per molecule of the modified liquid diene polymer (B1) is 2 to 20.

5. A modified liquid diene polymer (B2) comprising a product of modification, with a silane compound represented by the formula (1) below, of a liquid diene block copolymer (B'2) including a polymer block (b"1) containing butadiene units and a polymer block (b"2), the modified liquid diene polymer (B2) having a functional group derived from the silane compound represented by the formula (1) introduced at a polymer side chain, the modified liquid diene polymer (B2) satisfying the following (v) to (vii):
   (v) the weight average molecular weight (Mw) of the modified liquid diene polymer (B2) is 1,000 to 120,000,
   (vi) the polymer block (b"2) includes conjugated diene units other than butadiene, and
   (vii) the average number of the functional groups per molecule of the modified liquid diene polymer (B2) is 1 to 20,

[Chem. 2]

(1)

wherein $R^1$ is a $C_{1-6}$ divalent alkylene group, and $R^2$, $R^3$ and $R^4$ are each independently a methoxy group, an ethoxy group, a phenoxy group, a methyl group, an ethyl group or a phenyl group, with the proviso that at least one of $R^2$, $R^3$ and $R^4$ is a methoxy group, an ethoxy group or a phenoxy group, wherein the modified liquid diene polymer (B2) is a linear polymer, the polymer block (b"1) is present at one end or both ends of the liquid diene block copolymer (B'2), and the total length of the polymer block(s) (b"1) is not more than 45% of all the chain length of the liquid diene block copolymer (B'2).

6. The modified liquid diene polymer (B2) according to claim 5, wherein the modified liquid diene polymer (B2) is a linear polymer, and not less than 65% of the functional groups derived from the silane compound are present in a region or regions extending from one end or both ends to 45% in total of all the chain length of the modified liquid diene polymer (B2).

7. The modified liquid diene polymer (B2) according to claim 5, wherein the melt viscosity at 38° C. is 0.1 to 4,000 Pa·s.

8. A rubber composition comprising 100 parts by mass of a solid rubber (A), 0.1 to 50 parts by mass of a modified liquid diene polymer (B2) described in claim 5, and 20 to 200 parts by mass of a filler (C).

9. The rubber composition according to claim 8, wherein the filler (C) is at least one selected from carbon blacks and silicas.

10. The rubber composition according to claim 9, wherein the filler (C) is at least one selected from carbon blacks having an average particle size of 5 to 100 nm, and silicas having an average particle size of 0.5 to 200 nm.

11. The rubber composition according to claim 9, wherein the filler (C) comprises a silica, and the rubber composition further comprises 0.1 to 30 parts by mass of a silane coupling agent with respect to 100 parts by mass of the silica.

12. The rubber composition according to claim 8, wherein the solid rubber (A) is at least one selected from natural rubbers, styrene butadiene rubbers, butadiene rubbers and isoprene rubbers.

13. The rubber composition according to claim 12, wherein the solid rubber (A) is a styrene butadiene rubber having a weight average molecular weight of 100,000 to 2,500,000.

14. The rubber composition according to claim 12, wherein the solid rubber (A) is a styrene butadiene rubber having a styrene content of 0.1 to 70 mass %.

15. A crosslinked product obtained by crosslinking a rubber composition described in claim 8.

16. A tire comprising, as at least a portion of the tire, a crosslinked product described in claim 15.

17. A tire comprising, as at least a portion of the tire, a rubber composition described in claim 8.

18. The modified liquid diene polymer (B2) according to claim 5, wherein the polymer block (b"2) includes isoprene units.

19. The modified liquid diene polymer (B2) according to claim 5, wherein the weight average molecular weight (Mw) of the modified liquid diene polymer (B2) is 1,000 to 54,000.

\* \* \* \* \*